US010839155B2

(12) United States Patent
Oshima et al.

(10) Patent No.: US 10,839,155 B2
(45) Date of Patent: Nov. 17, 2020

(54) TEXT ANALYSIS OF MORPHEMES BY SYNTAX DEPENDENCY RELATIONSHIP WITH DETERMINATION RULES

(71) Applicant: Nomura Research Institute, Ltd., Tokyo (JP)

(72) Inventors: Osamu Oshima, Tokyo (JP); Morio Watanabe, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 130 days.

(21) Appl. No.: 16/138,387

(22) Filed: Sep. 21, 2018

(65) Prior Publication Data

US 2019/0026264 A1 Jan. 24, 2019

Related U.S. Application Data

(63) Continuation-in-part of application No. PCT/JP2016/059241, filed on Mar. 23, 2016.

(51) Int. Cl.
*G06F 40/211* (2020.01)
*G06F 40/268* (2020.01)
*G06F 40/279* (2020.01)
*G06F 16/31* (2019.01)

(52) U.S. Cl.
CPC .......... *G06F 40/268* (2020.01); *G06F 16/313* (2019.01); *G06F 16/316* (2019.01); *G06F 40/211* (2020.01)

(58) Field of Classification Search
CPC ...... G06F 40/20; G06F 40/211; G06F 40/242; G06F 40/268; G06F 40/279; G06F 40/30
USPC .................................. 704/1, 9, 10
See application file for complete search history.

(56) References Cited

U.S. PATENT DOCUMENTS

| 5,151,857 A | * | 9/1992 | Matsui | G06F 40/247 704/9 |
| 5,321,608 A | * | 6/1994 | Namba | G06F 40/253 704/9 |
| 5,361,205 A | * | 11/1994 | Nishino | G06F 40/58 704/2 |

(Continued)

FOREIGN PATENT DOCUMENTS

| JP | 2003-248681 | 9/2003 |
| JP | 2005-92254 | 4/2005 |

OTHER PUBLICATIONS

International Search Report dated Jun. 14, 2016 in corresponding International Patent Application No. PCT/JP2016/059241.

*Primary Examiner* — Martin Lerner
(74) *Attorney, Agent, or Firm* — Staas & Halsey LLP

(57) ABSTRACT

A morpheme analysis unit sets beforehand a meaning-candidate tag and a sentimental theme tag for a morpheme required to be input as a text. A syntax analysis unit generates an index where a clause including a meaning-candidate tag and a sentimental theme tag and a type of each tag. A meaning attribute extraction unit recognizes a clause including a meaning-candidate and a type of tag with reference to the index, and then applies a meaning attribute rule, sets a meaning attribute tag for a necessary clause, and updates the index. A sentimental analysis unit also recognizes a clause including a sentimental theme tag and a clause including a meaning attribute tag with reference to the index, and then applies a sentimental analysis rule and sets a sentimental attribute tag for a necessary clause.

7 Claims, 23 Drawing Sheets

(56) References Cited

U.S. PATENT DOCUMENTS

| | | | | |
|---|---|---|---|---|
| 5,590,039 A * | 12/1996 | Ikeda | G06F 40/205 | 704/9 |
| 5,671,425 A * | 9/1997 | Suematsu | G06F 40/253 | 704/9 |
| 5,774,845 A * | 6/1998 | Ando | G06F 40/268 | 704/231 |
| 7,805,303 B2 * | 9/2010 | Sugihara | G06F 40/30 | 704/257 |
| 8,762,131 B1 * | 6/2014 | Diaconescu | G06F 40/242 | 704/9 |
| 8,880,391 B2 * | 11/2014 | Sekine | G06F 40/268 | 704/9 |
| 2005/0256715 A1 * | 11/2005 | Okimoto | G06F 40/216 | 704/257 |
| 2006/0177808 A1 * | 8/2006 | Aosawa | G06F 40/30 | 434/322 |
| 2006/0235689 A1 * | 10/2006 | Sugihara | G06F 40/30 | 704/257 |
| 2007/0233465 A1 * | 10/2007 | Sato | G06F 40/211 | 704/10 |
| 2008/0288243 A1 * | 11/2008 | Kobayashi | G06F 40/268 | 704/9 |
| 2009/0012946 A1 * | 1/2009 | Tsunokawa | G06F 16/951 | |
| 2010/0318525 A1 * | 12/2010 | Mizuguchi | G06F 16/3331 | 707/748 |
| 2011/0246496 A1 * | 10/2011 | Chung | G06F 40/211 | 707/766 |
| 2013/0262085 A1 * | 10/2013 | Sekine | G06F 40/40 | 704/9 |
| 2014/0172415 A1 * | 6/2014 | Jo | G06F 40/30 | 704/9 |
| 2016/0283588 A1 * | 9/2016 | Katae | G06F 40/211 | |
| 2017/0255611 A1 * | 9/2017 | Kubosawa | G06F 40/205 | |
| 2020/0004817 A1 * | 1/2020 | Kudo | G06F 40/268 | |

* cited by examiner

FIG. 2

[MEANING ATTRIBUTE DICTIONARY]

| EXPRESSION PATTERN | TYPE OF MEANING ATTRIBUTE |
|---|---|
| ABSENT | DENIAL |
| ⋮ | ⋮ |
| PRESENT | AFFIRMATIVE |
| ⋮ | ⋮ |
| IS~? | QUESTION |
| DO~? | QUESTION |
| ISN'T~? | QUESTION |
| ⋮ | ⋮ |
| PLEASE | REQUEST |
| GRATEFUL | REQUEST |
| ⋮ | ⋮ |
| WHAT A SURPRISE! | OUT-OF-EXPECTATION |
| OH DEAR! | OUT-OF-EXPECTATION |
| ⋮ | ⋮ |
| NOT COOL | DISSATISFACTION |
| NOT EVEN | DISSATISFACTION |
| ⋮ | ⋮ |

FIG. 3A

[LARGE/SMALL EXPRESSION DICTIONARY]

| EXPRESSION PATTERN | TYPE OF LARGE/ SMALL EXPRESSION |
|---|---|
| LARGE | LARGE |
| COMPACT | SMALL |
| ENORMOUS | LARGE |
| NARROW | SMALL |
| ⋮ | |

FIG. 3B

[SENTIMENTAL EXPRESSION DICTIONARY]

| EXPRESSION PATTERN | TYPE OF SENTIMENTAL EXPRESSION |
|---|---|
| WONDERFUL | POSITIVE |
| GOOD | POSITIVE |
| BAD | NEGATIVE |
| UNCOOL | NEGATIVE |
| ⋮ | |

FIG. 4

[SENTIMENTAL THEME DICTIONARY]

| SENTIMENTAL THEME (ACCOMMODATION FACILITY) | RELATED WORD |
|---|---|
| COST | COST/CHARGE/PRICE/ACCOMMODATION FEE/ ROOM COST/ROOM CHARGE ... |
| FOOD | FOOD/DISH/DINNER/BREAKFAST/DESSERT/ ROOM SERVICE ... |
| ROOM | ROOM/GUEST ROOM/ROOM LAYOUT/ JAPANESE-STYLE ROOM/WESTERN-STYLE ROOM ... |
| BATH | BATH/BATHROOM/LARGE PUBLIC BATH/FAMILY BATH/ OPEN-AIR BATH/MEN'S BATH ... |
| LOCATION | LOCATION/ACCESS/FACILITY FOR COMMUNICATION/ NEAREST STATION/INTERCHANGE/IC ... |
| ⋮ | |

TEXT ANALYSIS OF MORPHEMES BY SYNTAX DEPENDENCY RELATIONSHIP WITH DETERMINATION RULES

CROSS-REFERENCE TO RELATED APPLICATIONS

This application is a Continuation-in-Part of International Application No. PCT/JP2016/059241 filed Mar. 23, 2016, the entire content of which is incorporated herein by reference.

BACKGROUND

Technical Field

The present invention relates to a text analysis system and a program, and particularly to a technology for automatically collecting subjective evaluations and opinions from end users concerning specific products, services and the like based on digitized document data, such as remark data given on an electronic bulletin board and answer data for questionnaire.

Related Art

Subjective evaluations (impressions) and remark intentions for specific products and services (hereinafter referred to as "products and the like") from end users are extremely important guidelines for improvement of current products and the like and development of products and the like for next generations. Accordingly, each company analyzes questionnaire results collected from end users in view of various points, or accesses an electronic bulletin board on the Internet to check evaluations of products and the like of the company.

In addition, for improving efficiency of manual analytical operations performed described above, such a technology is already proposed which extracts evaluations given from end users concerning specific products and the like by automatically analyzing a digitized text using a computer.

For example, JP 2003-248681 A discloses a technology which performs a morpheme process or a syntax analysis process for a text including an emotional expression for a predetermined target, and subsequently extracts the emotional expression from the concerned text with reference to an affecting term dictionary in which a large number of emotional expressions are registered, and also collects attributes (negative/positive or the like) of each emotional expression, and outputs a result of the collection to the outside. According to this technology, a distribution status of negative evaluations and positive evaluations can be presented for an evaluation target "lipstick" for each of a plurality of evaluation axes such as color tone, odor, comfort, and package.

Generally, computer-analysis of a text in a natural language written by a human executes a morpheme analysis for decomposing the text into morphemes corresponding to minimum constituent units and to identify parts of speech and the like, and a syntax analysis process for combining the respective morphemes into a plurality of clauses and also identifying a dependency relationship between the clauses. In this case, a syntax tree is generated as output.

Subsequently, a large number of rules are applied to this syntax tree in a predetermined order to extract meaning contents or the like of each text. This mechanism requires a considerable length of processing time to determine whether or not rules are applicable as the structure of the text becomes more complicated.

However, in consideration that a part of rules are applicable based on a morpheme sequence without referring to a syntax tree for determining whether or not the rules are applicable, JP 2005-092254 A applies rules at a stage of morpheme analysis to give meaning attributes, and applies only remaining rules to a syntactic tree after syntax analysis. In this manner, determination time required for applying rules is expected to decrease.

SUMMARY

However, only a limited number of rules can be applied without referring to the syntax tree for determining whether or not the rules are applicable. In this aspect, the reference identified above presents only an example of "from" which refers to both a "before in a timewise sense", and a "reason".

In fact, it is important to consider a dependency structure between clauses to accurately extract meaning contents and the like, such as an intention of a creator and an evaluation, from a complicated text described in a natural language. It is therefore exceptional to make a decision without consideration of the dependency structure. Accordingly, even when the technology of JP 2005-092254 A is applied, a dramatic improvement in a processing speed is unexpectable.

The present invention has been devised to solve the aforementioned conventional problems. An object of the present invention is to provide a technology capable of efficiently extracting meaning contents and the like from a text written in a natural language.

For achieving the above-mentioned object, a text analysis system comprises: a unit configured to decompose input text into morphemes; a pre-tag setting unit configured to set a pre-tag for a concerned morpheme with reference to attribute dictionaries each of which specifies a correspondence relationship between specific morphemes and types of attribute; a syntax analysis unit configured to identify a dependency relationship between respective morphemes or a dependency relationship between respective clauses each of which is an aggregation of respective morphemes; an index generation unit configured to generate an index where a combination of identification information that identifies a morpheme or a clause including a pre-tag and a type of the pre-tag are recorded; a determination rule storage unit configured to store a plurality of determination rules each including a combination of an application condition that designates at least a morpheme or a clause including a specific type of pre-tag, and an application effect that specifies a morpheme or a clause for which an attribute tag is set and a type of the attribute tag to be set; and a determination unit configured to set, with reference to the index and the determination rule storage unit, an attribute tag of a type designated in a morpheme or a clause designated in an application effect when a determination rule whose application condition matches with a concerned text is present.

A text analysis system according to a further aspect of the invention is the text analysis system described in the preceding paragraph, wherein: at least one of the attribute dictionaries is a meaning attribute dictionary that specifies a correspondence relationship between a specific morpheme and a type of a meaning attribute; a meaning-candidate tag as a pre-tag is set for a concerned morpheme by the pre-tag setting unit; the index is an index where a combination of identification information that identifies a clause including a meaning-candidate tag and a type of the meaning-candidate tag are recorded by the index generation unit; the determination rule storage unit stores a determination rule that includes a combination of an application condition that designates at least a clause including a specific type of meaning-candidate tag and an application effect that designates a clause for which a meaning attribute tag is set and a type of the meaning attribute tag to be set; and the determination unit sets, with reference to the index and the determination rule storage unit, a meaning attribute tag of a type designated in a clause designated in an application effect when a determination rule whose application condition matches with a concerned text is present.

A text analysis system according to a further aspect of the invention is the text analysis system described in the preceding paragraph, wherein: at least one of the attribute dictionaries is a sentimental theme dictionary that specifies a correspondence relationship between a specific morpheme and a type of sentimental theme; a sentimental theme tag as a pre-tag is set for a concerned morpheme by the pre-tag setting unit; the index is an index where a combination of identification information that identifies a clause including a sentimental theme tag and a type of the sentimental theme tag are recorded by the index generation unit; the determination rule storage unit stores a determination rule that includes a combination of an application condition that designates a clause including a specific type of sentimental theme tag and a type of a meaning attribute tag included in the corresponding clause or a different clause, and an application effect that designates a clause for which a sentimental attribute tag is set and a type of the sentimental attribute tag to be set; and the determination unit sets, with reference to the index and the determination rule storage unit, a sentimental attribute tag of a type designated in a clause designated in an application effect when a determination rule whose application condition matches with a concerned text is present.

A text analysis system according to a further aspect of the invention is the text analysis system described above, three paragraphs previously, wherein: the attribute dictionaries at least include a sentimental theme dictionary that specifies a correspondence relationship between a specific morpheme and a type of sentimental theme, and a large/small expression dictionary that specifies a correspondence relationship between a specific morpheme and a type of large/small expression; a sentimental theme tag and a large/small expression tag as pre-tags are set for a concerned morpheme by the pre-tag setting unit; the index is an index where a combination of identification information that identifies a clause including a sentimental theme tag and a type of the sentimental theme tag, and a combination of identification information that identifies a clause including a large/small expression tag and a type of the large/small expression are recorded by the index generation unit; the determination rule storage unit stores a determination rule that includes a combination of an application condition that designates a clause including a specific type of sentimental theme tag and a type of a large/small expression tag included in the corresponding clause or a different clause, and an application effect that designates a clause for which a sentimental attribute tag is set and a type of the sentimental attribute tag to be set; and the determination unit sets, with reference to the index and the determination rule storage unit, a sentimental attribute tag of a type designated in a clause designated in an application effect when a determination rule whose application condition matches with a concerned text is present.

A text analysis system according to a further aspect of the invention is the text analysis system described above, four paragraphs previously or in the preceding paragraph, wherein: the attribute dictionaries at least include a sentimental theme dictionary that specifies a correspondence relationship between a specific morpheme and a type of sentimental theme, and a sentimental expression dictionary that specifies a correspondence relationship between a specific morpheme and a type of sentimental expression; a sentimental theme tag and a sentimental expression tag as pre-tags are set for a concerned morpheme by the pre-tag setting unit; the index is an index where a combination of identification information that identifies a clause including a sentimental theme tag and a type of the sentimental theme tag, and a combination of identification information that identifies a clause including a sentimental expression tag and a type of the sentimental expression tag are recorded by the index generation unit; the determination rule storage unit stores a determination rule that includes a combination of an application condition that designates a clause including a specific type of sentimental theme tag and a type of a sentimental expression tag included in the corresponding clause or a different clause, and an application effect that designates a clause for which a sentimental attribute tag is set and a type of the sentimental attribute tag to be set; and the determination unit sets, with reference to the index and the determination rule storage unit, a sentimental attribute tag of a type designated in a clause designated in an application effect when a determination rule whose application condition matches with a concerned text is present.

A text analysis program according to a further aspect of the invention is a program under which a computer functions as: a unit configured to decompose input text into morphemes; a pre-tag setting unit configured to set a pre-tag for a concerned morpheme with reference to attribute dictionaries each of which specifies a correspondence relationship between specific morphemes and types of attribute; a syntax analysis unit configured to identify a dependency relationship between respective morphemes or a dependency relationship between respective clauses each of which is an aggregation of respective morphemes; an index generation unit configured to generate an index where a combination of identification information that identifies a morpheme or a clause including a pre-tag and a type of the pre-tag are recorded; a determination rule storage unit configured to store a plurality of determination rules each including a combination of an application condition that designates at least a morpheme or a clause including a specific type of pre-tag, and an application effect that specifies a morpheme or a clause for which an attribute tag is set and a type of the attribute tag to be set; and a determination unit configured to set, with reference to the index and the determination rule storage unit, an attribute tag of a type designated in a morpheme or a clause designated in an application effect when a determination rule whose application condition matches with a concerned text is present.

According to the text analysis system and program for embodiments, of the present invention, the predetermined rule is applied to the dependency relationship (syntax tree) between respective clauses to extract a subjective intention and a value determination and the like for a sentimental theme of a speaker from a text similarly to a conventional technology. In this case, however, presence and type of a clause to which the rule is to be applied can be immediately recognized with reference to the index generated beforehand based on the attribute dictionaries. Accordingly, whether or not the rule is applicable can be determined considerably rapidly even in case of a relatively long text or a complicated syntactic structure.

BRIEF DESCRIPTION OF DRAWINGS

FIG. 2 is a diagram showing a registration example of a meaning attribute dictionary;

FIGS. 3A and 3B are diagrams showing registration examples of a large/small expression dictionary and a sentimental expression dictionary, respectively;

FIG. 4 is a diagram showing a registration example of a sentimental theme dictionary;

DETAILED DESCRIPTION

Figure 1:
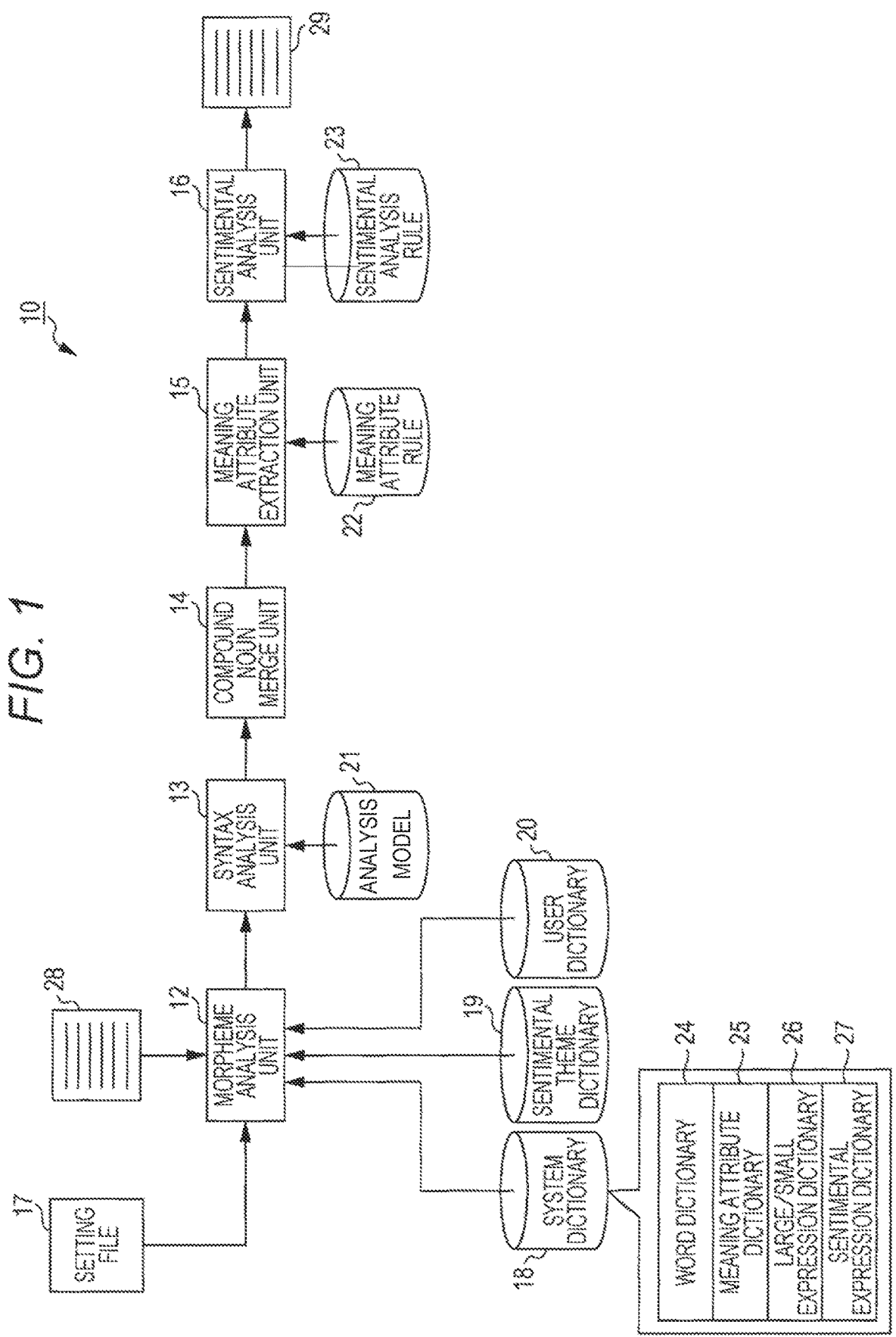
FIG. 1 is a block diagram showing a functional configuration of a text analysis system according to the present invention.

FIG. 1 is a block diagram showing a functional configuration of a text analysis system 10 according to the present invention. The text analysis system 10 includes a morpheme analysis (including deposition of input text into morphemes or words, and identification of parts of speech) unit 12, a syntax analysis unit 13, a compound noun merge unit 14, a meaning attribute extraction unit 15, a sentimental analysis unit 16, a setting file 17, a system dictionary storage unit 18, a sentimental theme dictionary storage unit 19, a user dictionary storage unit 20, an analysis model storage unit 21, a meaning attribute rule storage unit 22, and a sentimental analysis rule storage unit 23.

The morpheme analysis unit 12, the syntax analysis unit 13, the compound noun merge unit 14, the meaning attribute extraction unit 15, and the sentimental analysis unit 16 are implemented by a central processing unit (CPU) of a computer which executes necessary processing under an OS and an application program.

The setting file 17, the system dictionary storage unit 18, the sentimental theme dictionary storage unit 19, the user dictionary storage unit 20, the analysis model storage unit 21, the meaning attribute rule storage unit 22, and the sentimental analysis rule storage unit 23 are provided in a storage device of the computer.

A general-purpose meaning attribute dictionary 25, a large/small expression dictionary 26, a sentimental expression dictionary 27, and the like are stored in the system dictionary storage unit 18, in addition to a word dictionary 24 which is an ordinary dictionary necessary for morpheme analysis.

As shown in FIG. 2, the "meaning attribute dictionary" specifies a correspondence relationship between specific expression patterns and types of meaning attributes (types of expressions indicating intention of remark, such as denial, affirmation, question, request, out-of-expectation, and dissatisfaction).

As shown in FIG. 3A, the "large/small expression dictionary" specifies a correspondence relationship between expression patterns indicating largeness or smallness of items, and types of large/small expressions (large/small classifications).

As shown in FIG. 3B, the "sentimental expression dictionary" specifies a correspondence relationship between expression patterns indicating evaluations of items, and types of sentimental expressions (positive type and negative type).

The sentimental theme dictionary storage unit 19 stores many sentimental theme dictionaries each defining sentimental themes (evaluation axes/viewpoints) and related terms of sentimental themes for each product or service field.

FIG. 4 shows a registration example of a sentimental theme dictionary associated with an accommodation service field such as hotels and inns. For an evaluation axis of "cost", synonyms and related words such as "charge", "price", "accommodation fee", and "room charge" are stored as well as "cost" as similar expressions. These similar expressions are compiled for each industry while referring to general synonym dictionaries and the like, and considering characteristics of each industry.

Accordingly, for the evaluation axis of "cost", names peculiar to the hotel or inn industry, such as "accommodation fee" and "room charge", are listed in addition to general names such as "cost", "fee", and "price".

For providing services to users belonging to a food and beverage industry, an evaluation axis similar expression dictionary for the food and beverage industry, which dictionary includes a list containing similar expressions such as "food and drink fee" and "drink charge" instead of the "accommodation fee" and "room charge", is adopted.

The system dictionary storage unit 18 and the sentimental theme dictionary storage unit 19 described above are general-purpose units prepared in advance on the system side, whereas the user dictionary storage unit 20 stores various types of dictionaries uniquely prepared on the user side (unique meaning attribute dictionary, large/small expression dictionary, sentimental expression dictionary, and sentimental theme dictionary).

A user using this system 10 designates in advance which dictionary is to be applied in the setting file 17.

The analysis model storage unit 21 stores a statistical model for syntax analysis generated by applying statistical analysis to a large amount of texts (learning corpus).

When a text file 28 including a large number of texts is input to the system 10 as an analysis target, the morpheme analysis unit 12 executes a morpheme analysis process.

For example, the text file 28 is constituted by a list of reply texts associated with questionnaires and collected from a large number of end users.

Figure 5:
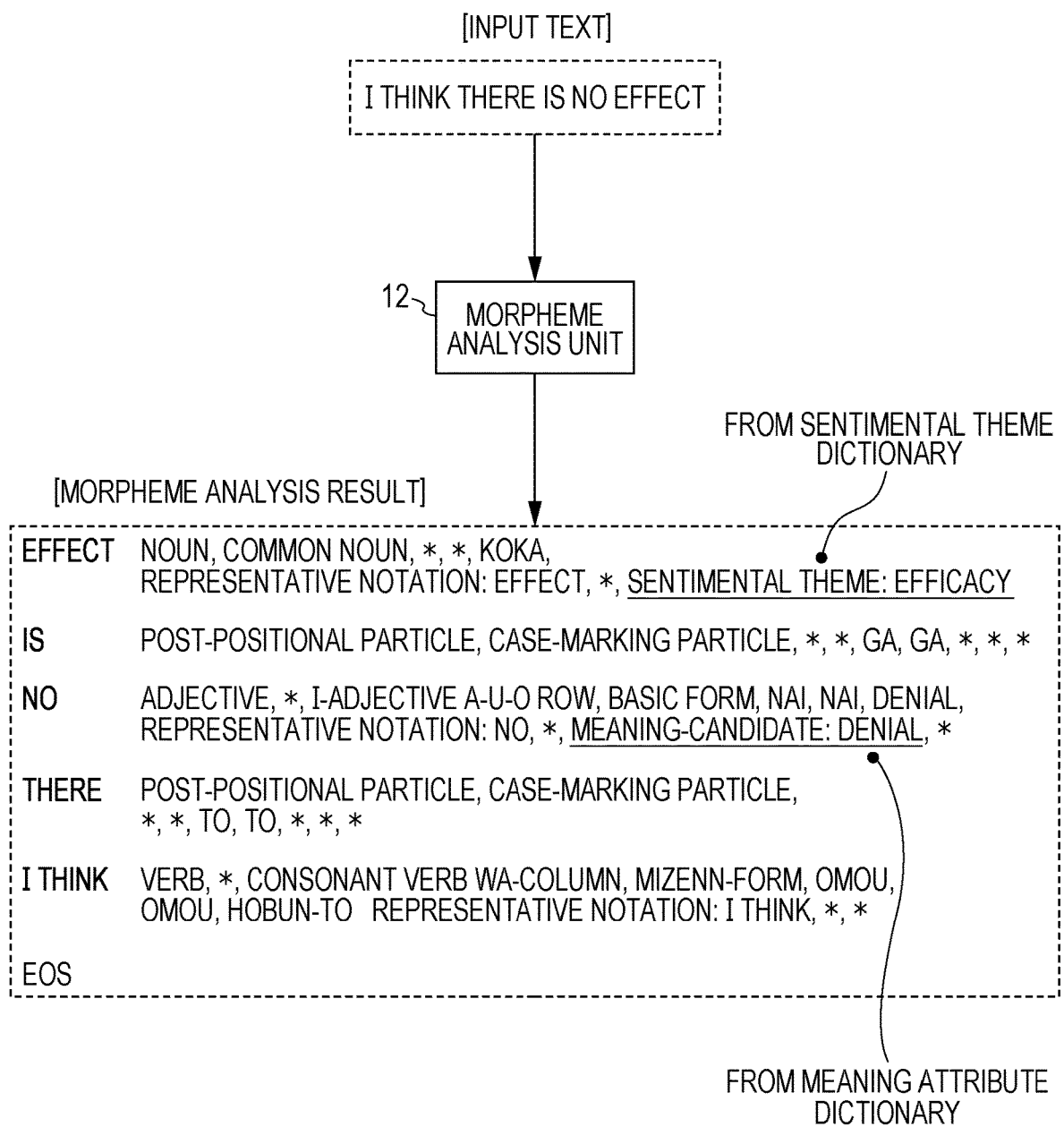
FIG. 5 is a diagram showing output data from a morpheme analysis unit.

For example, when a text "I think there is no effect" is included in the text file 28, the morpheme analysis unit 12 decomposes this text into morpheme units of "effect", "is", "no", "there", and "I think", and identifies parts of speech, reading and the like as shown in FIG. 5.

The morpheme analysis unit 12 also has a function as a pre-tag setting unit. The morpheme analysis unit 12 associates a morpheme with a sentimental theme tag as a pre-tag with reference to a sentimental theme dictionary relating to a field designated in the setting file 17 when the concerned morpheme defined in advance as a term expressing a sentimental theme is included in respective morphemes.

In FIG. 5, a sentimental theme tag "efficacy" is given to a morpheme "effect".

The morpheme analysis unit 12 associates a specific morpheme with a meaning-candidate tag as a pre-tag indicating a type of a meaning attribute of the morpheme with reference to a meaning attribute dictionary 25 in the system dictionary storage unit 18.

As described above, the meaning attribute is a morpheme type indicating intention, evaluation, and value determination of a person who has created a concerned text. A tag corresponding to a type such as "denial", "question", "demand", and "out-of-expectation" is associated with a concerned morpheme.

However, syntax analysis is not completed at this time. Accordingly, the associated meaning-candidate tag is merely a provisional "meaning-candidate", and is not decided yet.

In FIG. 5, a meaning-candidate tag "denial" is given to the morpheme "no".

While not shown in FIG. 5, the morpheme analysis unit 12 gives a "large/small expression tag" as a pre-tag corresponding to a type of "large/small", or a sentimental expression tag as a pre-tag corresponding to a type of "positive/negative" with reference to the large/small expression dictionary 26 and the sentimental expression dictionary 27 in the system dictionary storage unit 18 when a concerned morpheme is included.

The large/small expression and the sentimental expression have obvious expressive contents. Accordingly, these expressions are not handled as "large/small candidate" and "sentimental candidate" but are decided at this point without a necessity of syntax analysis.

Sentimental theme and sentimental expression (positive/negative) of some morphemes are simultaneously determined by one word.

For example, when a word "elegant" is used in a specific product field, "sentimental theme: design" and "sentimental expression type: positive" can be identified. This word is therefore defined in advance in the sentimental theme dictionary or the like.

Figure 6:
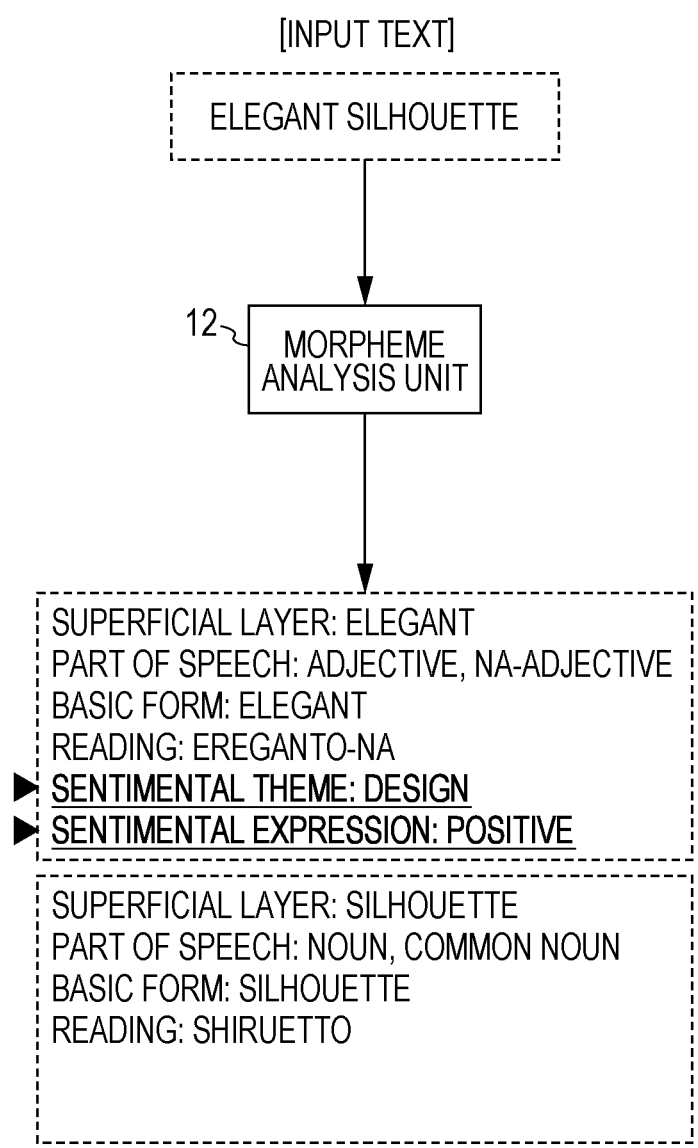
FIG. 6 is a diagram showing an example case where a sentimental theme and a sentimental expression can be decided by a word.

As a result, in case of input of a text "elegant silhouette" as shown in FIG. 6, a sentimental expression tag "positive" is given to a morpheme analysis result of "elegant" as well as a sentimental theme tag "design".

Similarly, "sentimental theme: quality" and "type of sentimental expression: positive" can be derived from a word "high quality". This word is therefore defined in advance in the sentimental theme dictionary or the like.

Figure 7:
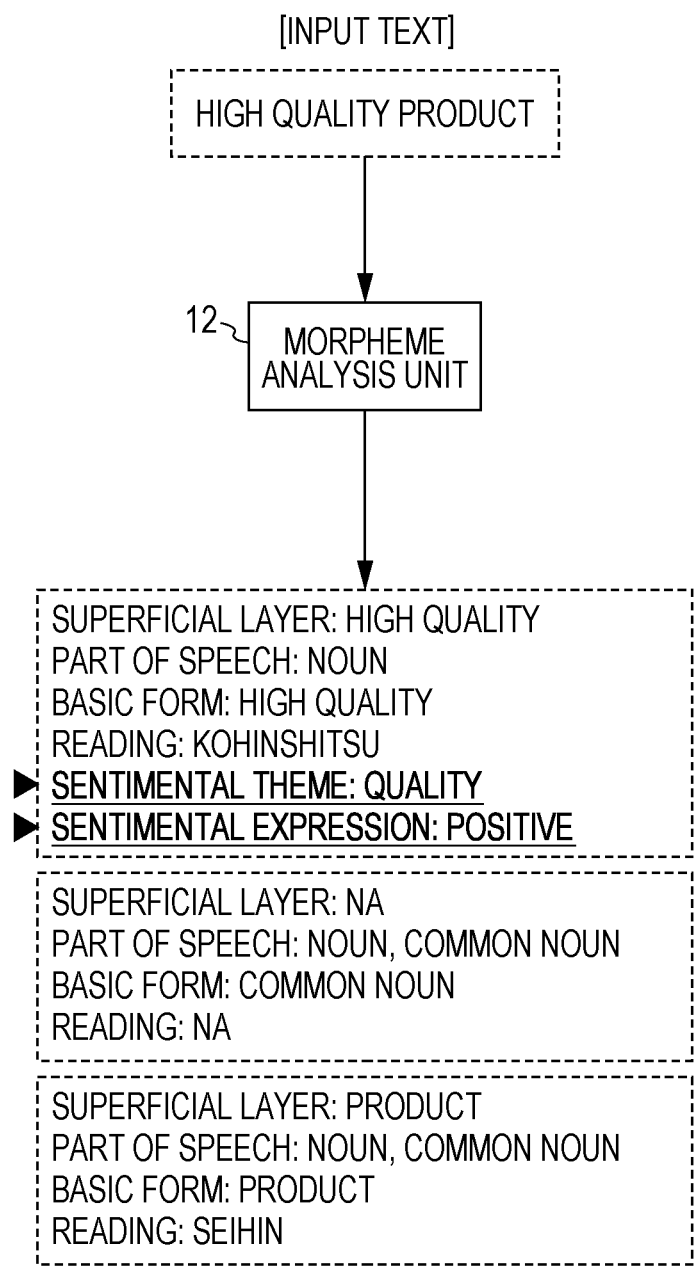
FIG. 7 is a diagram showing an example case where a sentimental theme and a sentimental expression can be decided by a word.

As a result, in case of input of a text "high quality product" as shown in FIG. 7, a sentimental expression tag "positive" is given to a morpheme analysis result of "high quality" as well as a sentimental theme tag "quality".

After completion of morpheme analysis, the morpheme analysis unit 12 outputs an analysis result to the syntax analysis unit 13.

The syntax analysis unit 13 having received this result combines respective morphemes into units of clause, and then identifies a dependency relationship between respective clauses.

At this time, the syntax analysis unit 13 refers to the statistical model stored in the analysis model storage unit 21 to perform highly precise syntax analysis.

Figure 8:
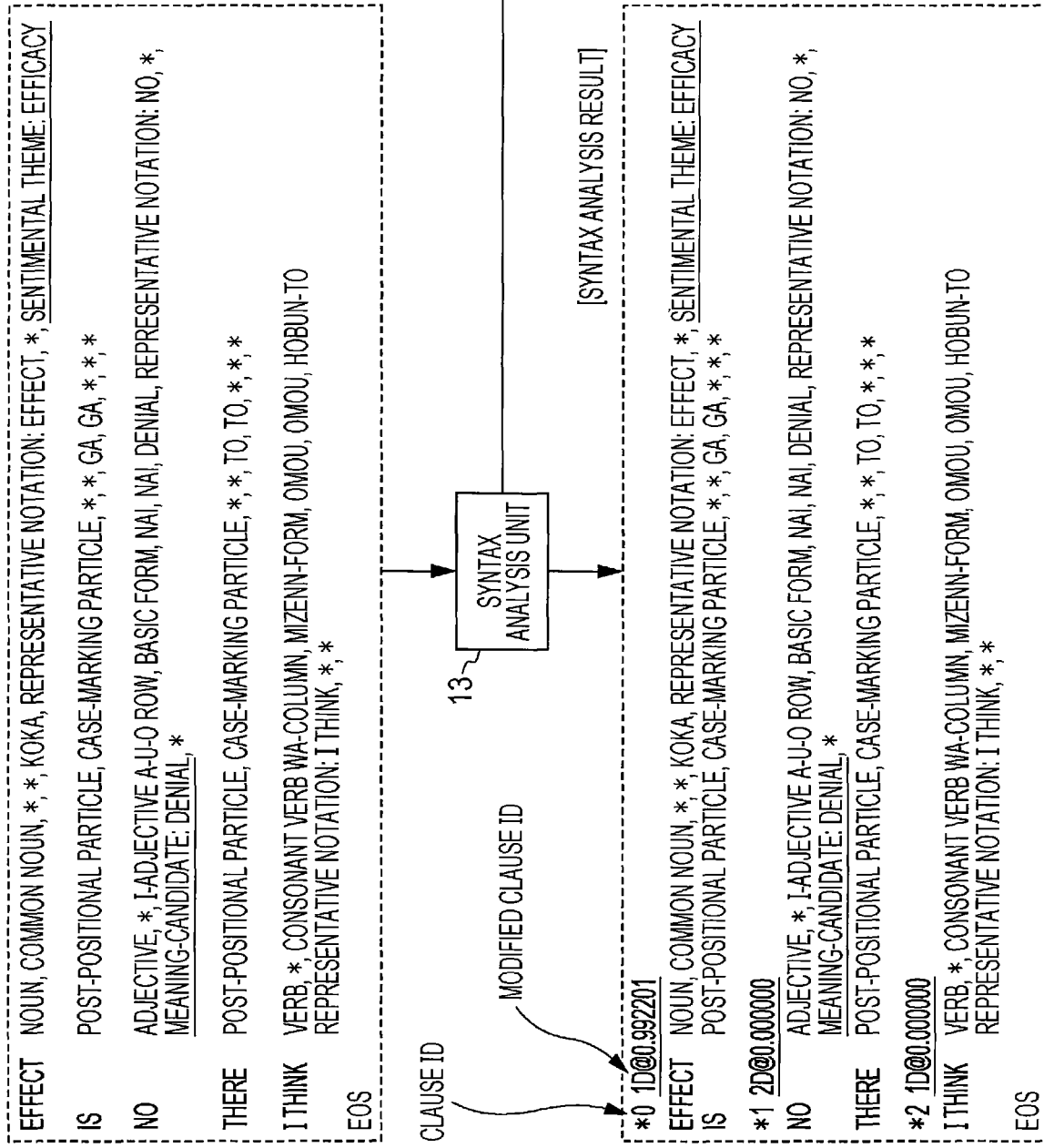
FIG. 8 is a diagram showing output data from a syntax analysis unit.

In FIG. 8, respective morphemes of "effect", "is", "no", "there" and "I think" are aggregated into three clauses of "effect (clause ID: 0)", "there is no (clause ID: 1)", "I think (clause ID: 2)". A dependency relationship between clauses is expressed by adding a modified clause ID to the right side of each clause ID. Specifically, a dependency relationship as "effect"←"there is no"←"I think" is derived.

The syntax analysis unit 13 has a function as an index generation unit. The syntax analysis unit 13 extracts a sentimental theme tag and a meaning-candidate tag associated with a morpheme in each clause, and writes the extracted tags to a different area of the storage device as an index.

Generated in FIG. 8 is an index 40 which includes information indicating that a sentimental theme "efficacy" is associated with Chunk 0 (clause 0), and information indicating that a meaning-candidate "denial" is associated with Chunk 1 (clause 1).

When a morpheme to which a large/small expression tag or a sentimental expression tag is given is included in a clause, the syntax analysis unit 13 also describes information indicating presence of this tag (clause for which tag is set and tag type) in the index 40.

Figure 9:
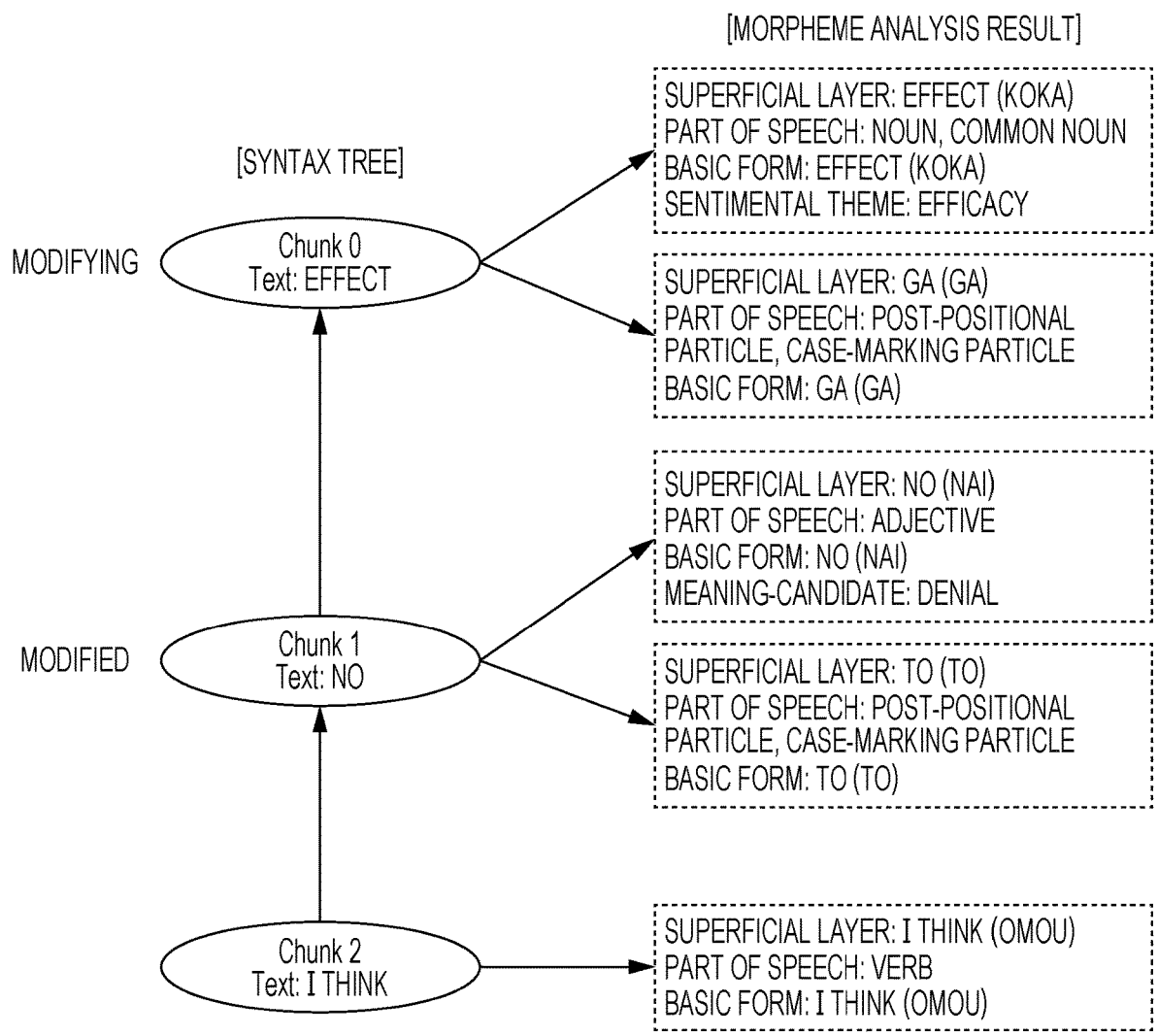
FIG. 9 is a diagram showing an example in which output data from the syntax analysis unit is expressed as a syntax tree.

FIG. 9 is a diagram which applies a predetermined graph object conversion tool to output data from the syntax analysis unit 13 to express the output data as a syntax tree, showing a dependency relationship between respective clauses as a tree structure.

When a plurality of nouns are continuously present in the same clause at this time, the nouns are connected to one morpheme by the compound noun merge unit 14.

Figure 10:
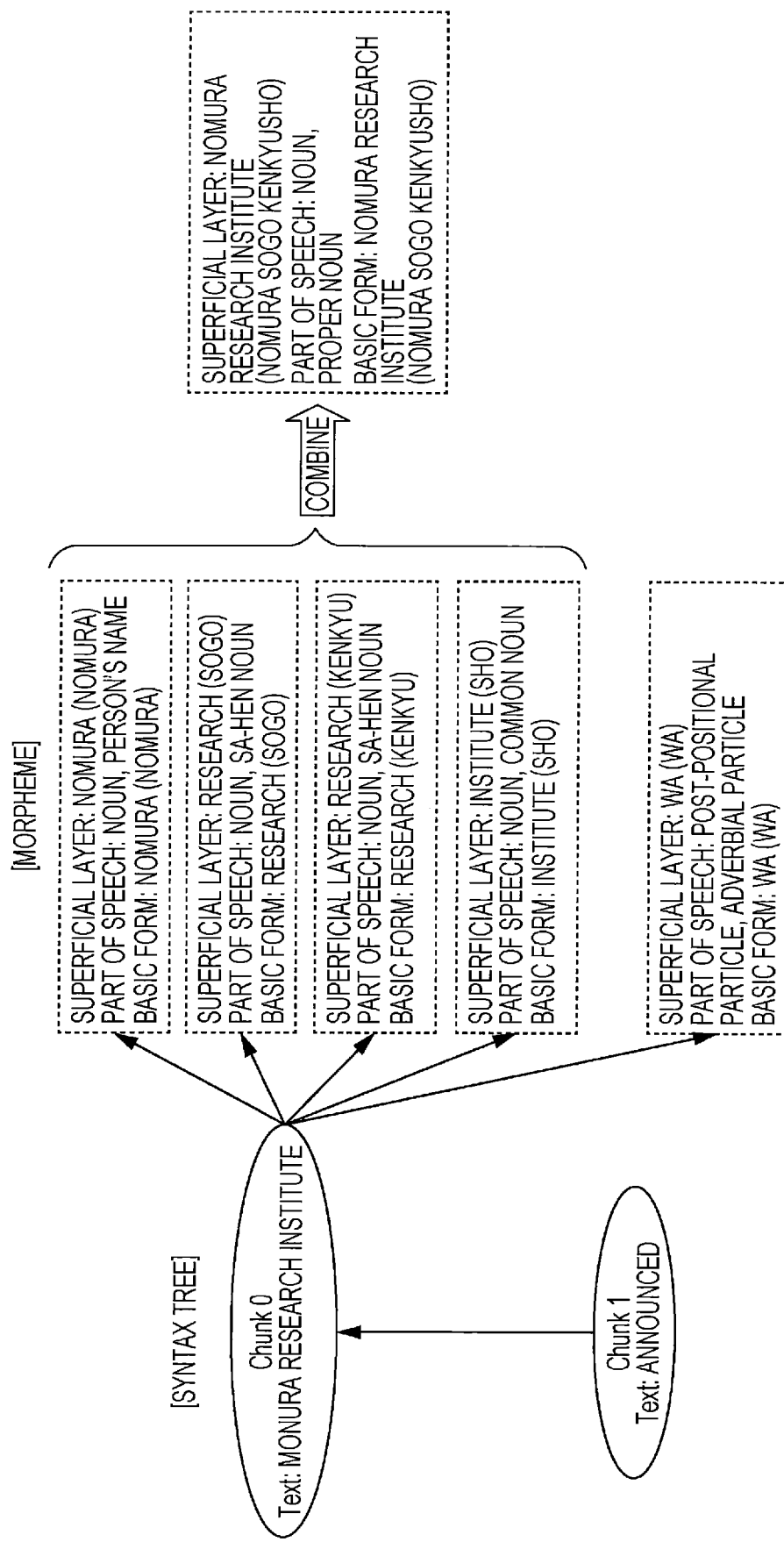
FIG. 10 is a diagram showing processing contents of a compound noun merge unit.

For example, as shown in FIG. 10, there are four continuous nouns "Nomura", "Research", "Research", "Institute" in a clause "Nomura Research Institute" (Chunk 0). Accordingly, the compound noun merge unit 14 combines the respective nouns into one morpheme "Nomura Research Institute".

Next, a meaning attribute extraction process is executed by the meaning attribute extraction unit 15.

The "meaning attribute extracting process" herein is a process for deciding whether or not a "meaning-candidate" is truly appropriate as a "meaning attribute" by applying a meaning attribute rule to a clause including a morpheme for which a meaning-candidate tag is set.

Figure 11:
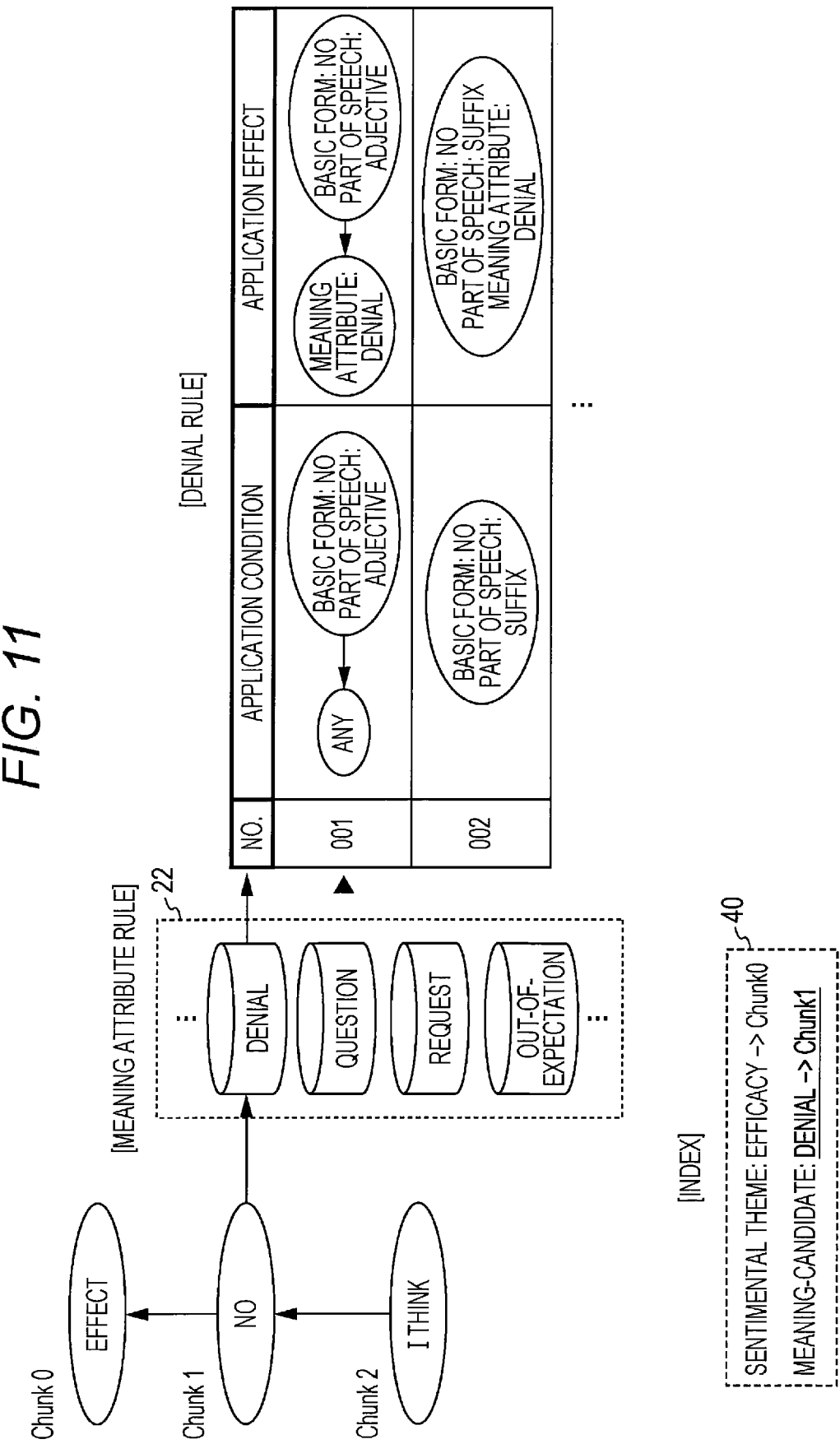
FIG. 11 is a diagram showing an application example of a meaning attribute rule.

Initially, as shown in FIG. 11, the meaning attribute extraction unit 15 identifies a clause including a morpheme for which a meaning-candidate tag is set, and a type of a meaning-candidate with reference to the index 40.

A meaning-candidate tag of "denial" is herein set for the clause 1 (Chunk 1).

Next, the meaning attribute extraction unit 15 extracts a meaning attribute rule for a meaning-candidate "denial" from the meaning attribute rule storage unit 22, and applies this rule to a concerned syntax tree (dependency structure between respective clauses).

More specifically, a large number of combinations of "application condition" and "application effect" are registered in the meaning attribute rule in a priority order. The meaning attribute extraction unit 15 compares a clause including the morpheme for which the meaning-candidate tag is set and application conditions of the respective meaning attribute rules sequentially from the top, and executes processing specified in the application effect of a concerned meaning attribute rule at the time of matching.

The figure shows an example of matching with the first meaning attribute rule.

More specifically, in case of a rule "NO. 001" in this example, the application condition is "clause to be modified includes "no (basic form)" as an adjective". Accordingly, the application condition matches with "there is no" in the clause 1 (Chunk 1).

Figure 12:
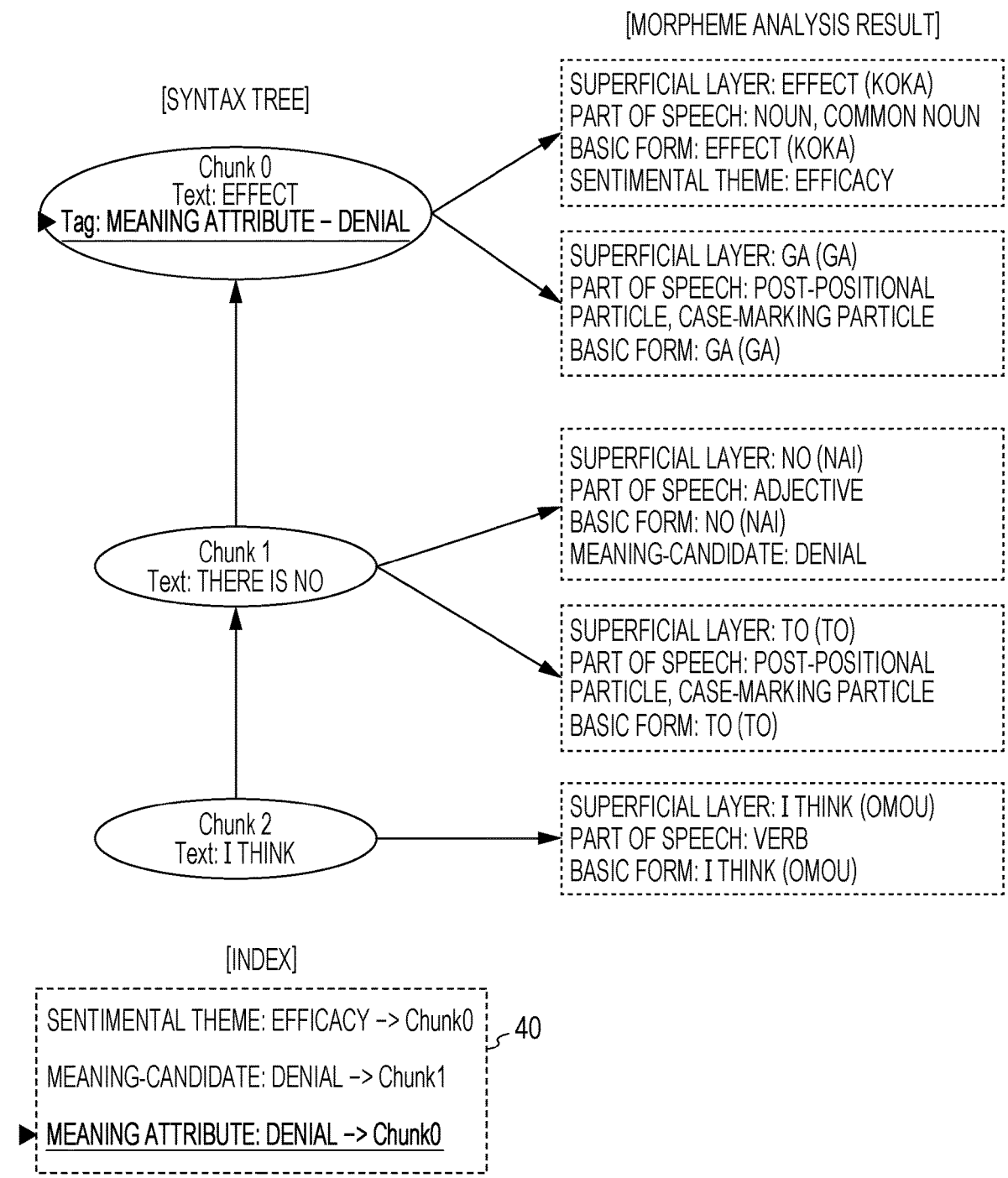
FIG. 12 is a diagram showing an application effect of a meaning attribute rule.

The application effect of "NO. 001" rule is "giving a meaning attribute "denial" to a modifying clause". Accordingly, the meaning attribute extraction unit 15 follows this application effect, and gives a meaning attribute tag "denial" to the clause 0 (Chunk 0) as shown in FIG. 12.

At the same time, the meaning attribute extraction unit 15 also adds, to the index 40, information that the meaning attribute tag "denial" has been given to the clause 0.

When the clause for which the meaning-candidate tag is set or the dependency structure between the concerned clause and a different clause does not match with any meaning attribute rule, the meaning-candidate remains as a candidate.

The meaning attribute extraction unit 15 may identify a clause to which the meaning attribute rule is to be applied with reference to the index 40 for each meaning attribute rule and determine compatibility of the rule, instead of identifying a clause for which the meaning-candidate tag is set with reference to the index 40 and then sequentially applying the meaning attribute rule as described above.

The meaning attribute rule is actually written in conformity with a JavaScript Object Notation (JSON) format.

In case of the rule of "NO. 001" in FIG. 11, illustrated in conformity with the JSON format, the index is searched for a reference chunk (clause including denial meaning-candidate tag) including "no" as an adjective in the reference chunk as the application condition, and a meaning attribute tag of "denial" to a child chunk (modifying clause) as an application effect.

In case of the rule of "NO. 002" in FIG. 11, illustrated in accordance with the JSON format, the index is searched for a reference chunk (clause including denial meaning-candidate tag) including "no" as a suffix in the reference chunk as the application condition, and adding a meaning attribute tag "denial" to the reference chunk as an application effect.

Instead of applying the meaning attribute rule in the JSON format without change, the meaning attribute extraction unit 15 may convert the rule of the JSON format into an operation logic of a graph object by using a rule generator, and then apply the rule to a compiler to convert the rule into executable binary data before application.

In this manner, the rule compatibility determination process can be performed at high speed by converting each rule into executable binary data and introducing the data as codes of the program.

Next, a sentimental analysis process is executed by the sentimental analysis unit 16.

The "sentimental analysis process" herein is a process for identifying a positive (affirmative) or negative (denying) sentimental attribute for a sentimental theme of a concerned text by applying a sentimental analysis rule to individual clauses or a dependency structure between clauses included in a syntax tree.

Figure 13:
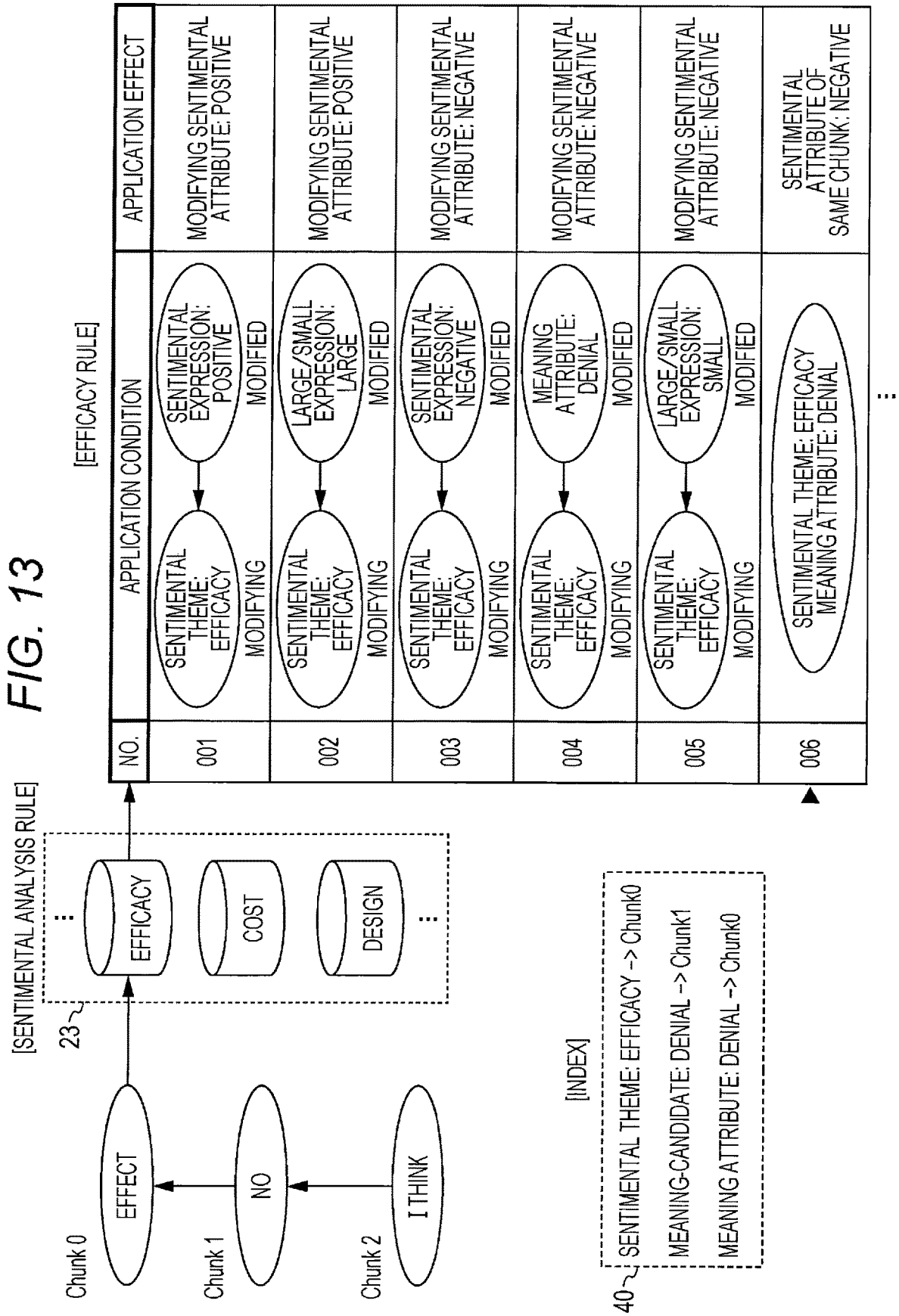
FIG. 13 is a diagram showing an application example of a sentimental attribute rule.

Initially, as shown in FIG. 13, the sentimental analysis unit 16 identifies a type of a sentimental theme tag set for the syntax tree, and clauses of the syntax tree with reference to the index 40.

A sentimental theme "efficacy" is herein set for the clause 0 (Chunk 0).

Next, the sentimental analysis unit 16 extracts a sentimental analysis rule for "efficacy" from the sentimental analysis rule storage unit 23, and applies the rule to the concerned syntax tree.

More specifically, many combinations of "application condition" and "application effect" are registered in the sentimental analysis rule in priority order.

Specified as the "application condition" is information designating a dependency relationship between a clause for which a sentimental theme tag is set and different clauses for each of which a predetermined tag (sentimental expression tag, large/small expression tag, and meaning attribute tag) is set, or information designating that a predetermined tag (sentimental expression tag, large/small expression tag, and meaning attribute tag) is overlaid and set in the clause for which the sentimental theme tag is set.

Specified as the "application effect" is information designating a clause to which a positive or negative sentimental attribute tag is to be given.

The sentimental analysis unit 16 sequentially compares the target clause or the dependency structure between clauses and respective sentimental analysis rules from the top, and executes a process designated by the application effect of the sentimental analysis rule at the time of matching.

Shown in the figure is an example of matching with the sixth sentimental analysis rule from the top.

More specifically, in case of the rule "NO. 006", the application condition is "clause for which a sentimental theme tag of efficacy and a negative meaning attribute tag are set". Accordingly, this rule matches with the clause 0 (Chunk 0).

The application effect of the rule "NO. 006" is "setting a negative sentimental attribute tag for the corresponding clause". Accordingly, the sentimental analysis unit 16 follows the application effect, and gives a "negative" sentimental attribute tag to the clause 0 (Chunk 0) as shown in FIG. 14.

At the same time, the sentimental analysis unit 16 also adds, to the index 40, information indicating that the sentimental attribute tag "negative" has been given to the clause 0.

The sentimental analysis unit 16 may identify the target clause with reference to the index 40 for each sentimental analysis rule and determine compatibility of the rule, instead of identifying the clause for which the sentimental theme tag is set and the clause for which the sentimental expression tag or the like is set with reference to the index 40, and then sequentially applying the sentimental analysis rule as described above.

Figure 14:
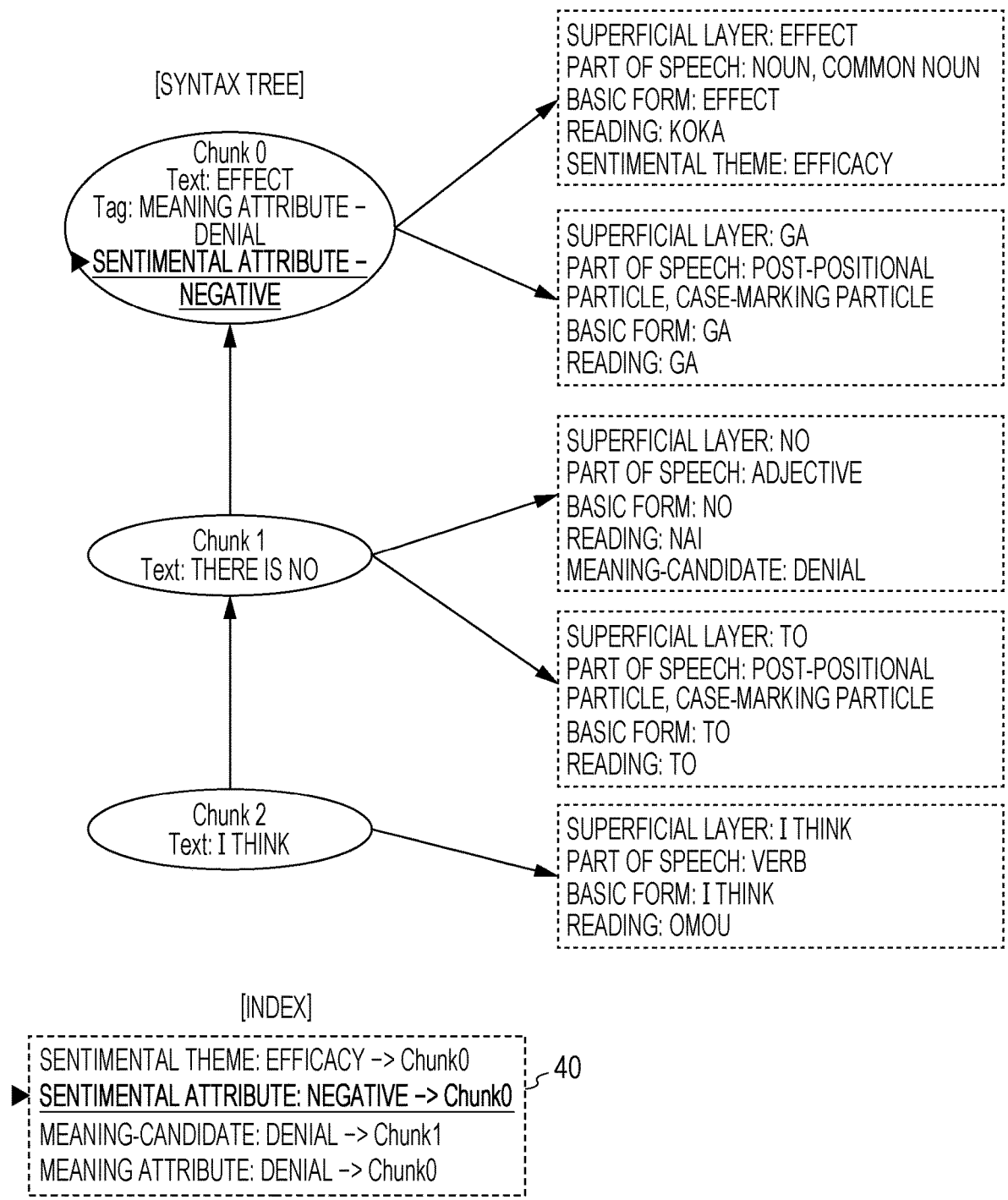
FIG. 14 is a diagram showing an application effect of a sentimental attribute rule.

The information shown in FIG. 14, i.e., the analysis result of each morpheme, the dependency structure between clauses (syntax tree), the tag given to each clause, and the index 40 are analysis results 29 obtained by the present system 10.

More specifically, the clause 0 (Chunk 0) includes a morpheme having the sentimental theme tag "efficacy", the sentimental attribute tag "negative" is set for the clause 0. In this case, an analysis result indicates that the text "I think there is no effect" is analyzed as "a text showing a negative opinion about efficacy".

Accordingly, opinions and evaluations concerning specific products and services are collectable from end users by applying the foregoing sentimental analysis to a large number of texts (e.g., questionnaire texts).

Example 1

Figure 15:
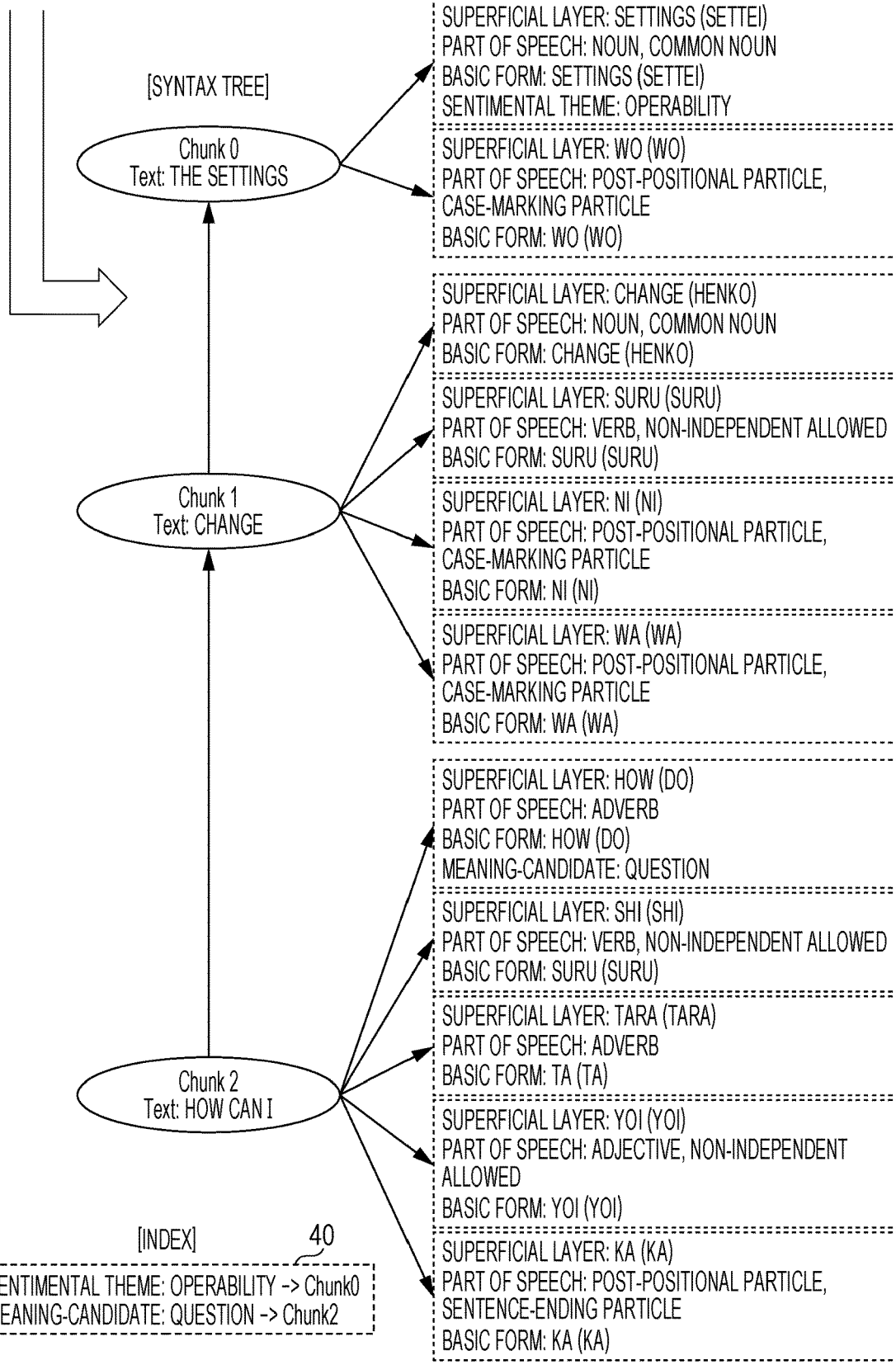
FIG. 15 is a diagram showing a syntax tree according to Example 1.

FIG. 15 shows morpheme analysis and a syntax analysis result at the time of input of a text "How can I change the settings?".

As shown in the figure, the index 40 describes that a sentimental theme tag "operability" is set for the clause 0 (Chunk 0), and that a meaning-candidate tag "question" is set for the clause 2 (Chunk 2).

In this case, the meaning attribute extraction unit 15 extracts a meaning attribute rule for question from the meaning attribute rule storage unit 22, and sequentially applies an application condition of each meaning attribute rule to a syntax tree of the concerned text. Then, the meaning attribute extraction unit 15 executes a process specified in an application effect of the concerned meaning attribute rule at the time of matching.

Figure 16:
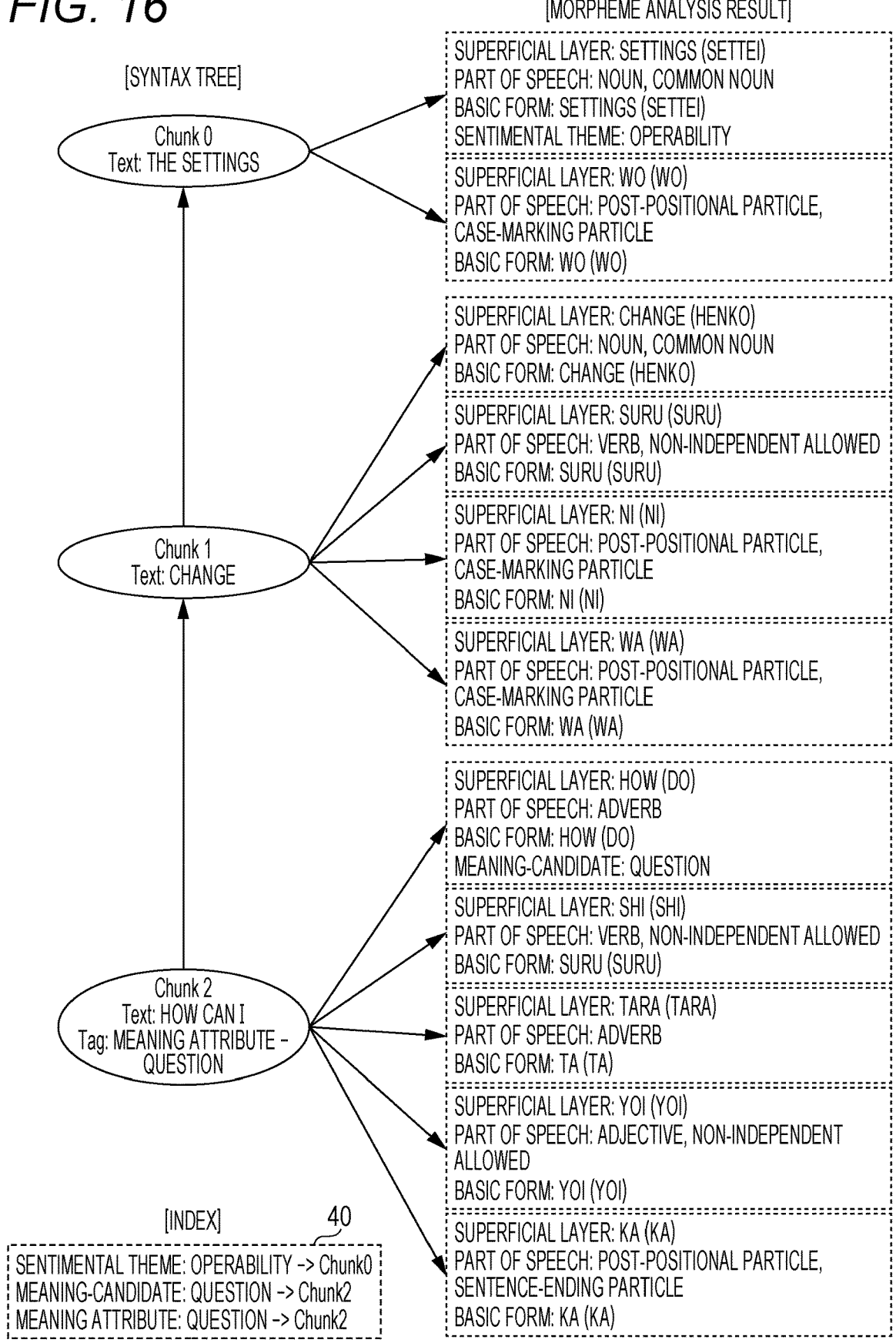
FIG. 16 is a diagram showing an application effect of a meaning attribute rule in Example 1.

FIG. 16 shows an application result of a certain meaning attribute rule. A meaning attribute tag "question" is set for the clause 2 (Chunk 2), and information indicating this setting is also added to the index 40.

The application condition and application effect of this meaning attribute rule are as follows.
[Application Condition]:
(1) The "meaning-candidate: question" is set for an adverb "How".
(2) A verb "do (basic form)" follows "how". [Application Effect]:
A meaning attribute tag "question" is given to the concerned clause.

The sentimental analysis unit 16 attempted to apply the sentimental analysis rule associated with the sentimental theme "operability" to the output from the meaning attribute extraction unit 15. However, no matching rule was present, wherefore the sentimental attribute tag (positive/negative) was not set.

Therefore, what is shown in FIG. 16 is a final analysis result for the text "How can I change the settings?".

In this case, a final evaluation from the end user concerning the sentimental theme "operability", i.e., "good operability/bad operability", cannot be extracted. However, at least extraction of a question about operability has been achieved. Accordingly, this output can be used in searching for improvement in operability.

Example 2

Figure 17:
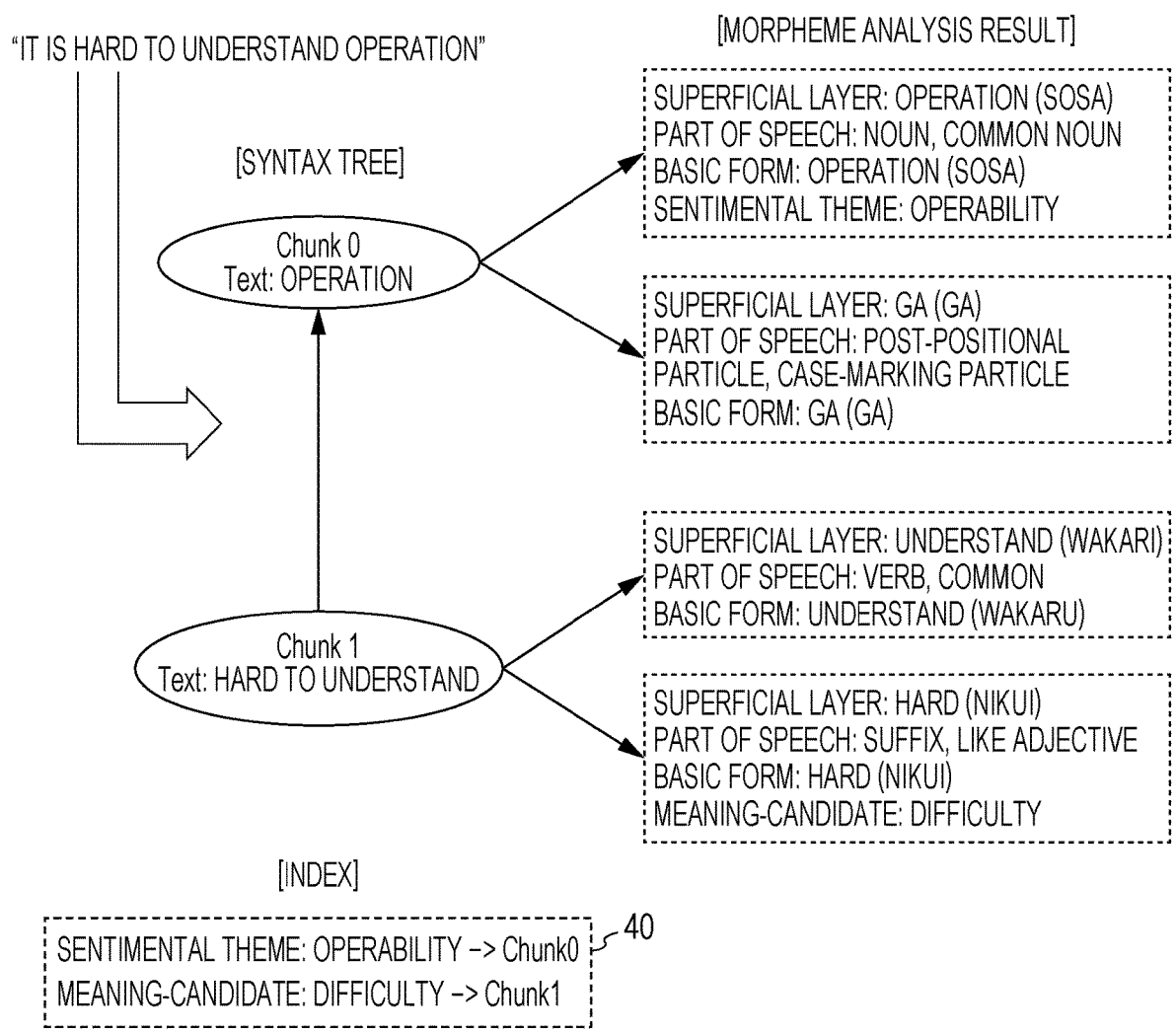
FIG. 17 is a diagram showing a syntax tree in Example 2.

FIG. 17 shows morpheme analysis and a syntax analysis result at the time of input of a text "It is hard to understand operation".

As shown in the figure, the index 40 describes that a sentimental theme tag "operability" is set for the clause 0 (Chunk 0), and that a meaning-candidate tag "difficult" is set for the clause 1 (Chunk 1).

In this case, the meaning attribute extraction unit 15 extracts a meaning attribute rule for difficulty from the meaning attribute rule storage unit 22, and sequentially applies an application condition of each meaning attribute rule to a syntax tree of the concerned text. Then, the meaning attribute extraction unit 15 executes a process specified in an application effect of the concerned meaning attribute rule at the time of matching.

Figure 18:
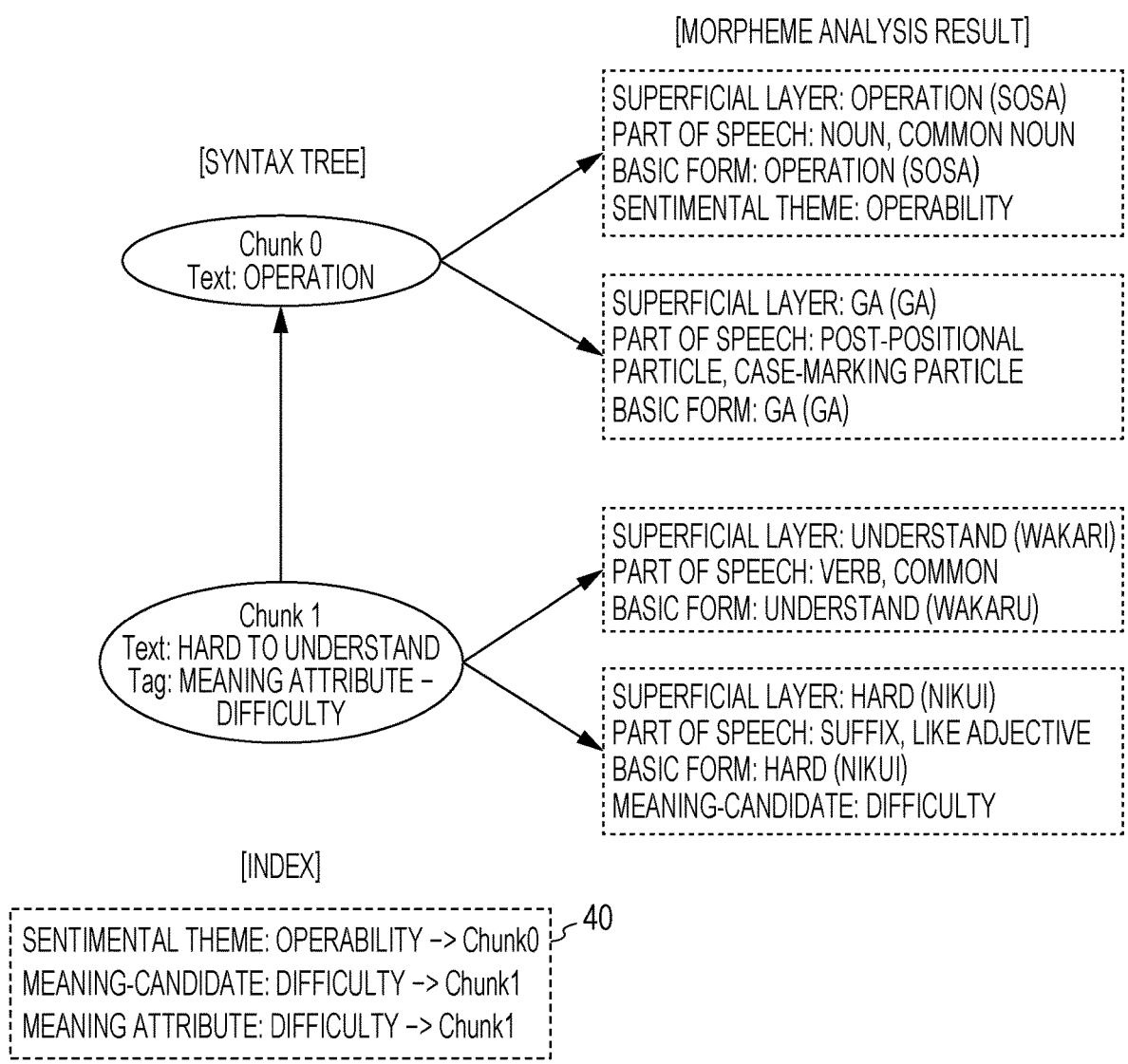
FIG. 18 is a diagram showing an application effect of a meaning attribute rule in Example 2.

FIG. 18 shows an application result of a certain meaning attribute rule. A meaning attribute tag "difficult" is set for the clause 1 (Chunk 1), and information indicating this setting is also added to the index 40.

The application condition and application effect of this meaning attribute rule are as follows, for example.
[Application Condition]:
(1) A verb morpheme is present.
(2) A word "hard (basic form reading)" follows the verb.
[Application Effect]:
A meaning attribute tag "difficult" is given to the concerned clause.

The sentimental analysis unit 16 attempts to apply the sentimental analysis rule associated with the sentimental theme "operability" to the output from the meaning attribute extraction unit 15.

Figure 19:
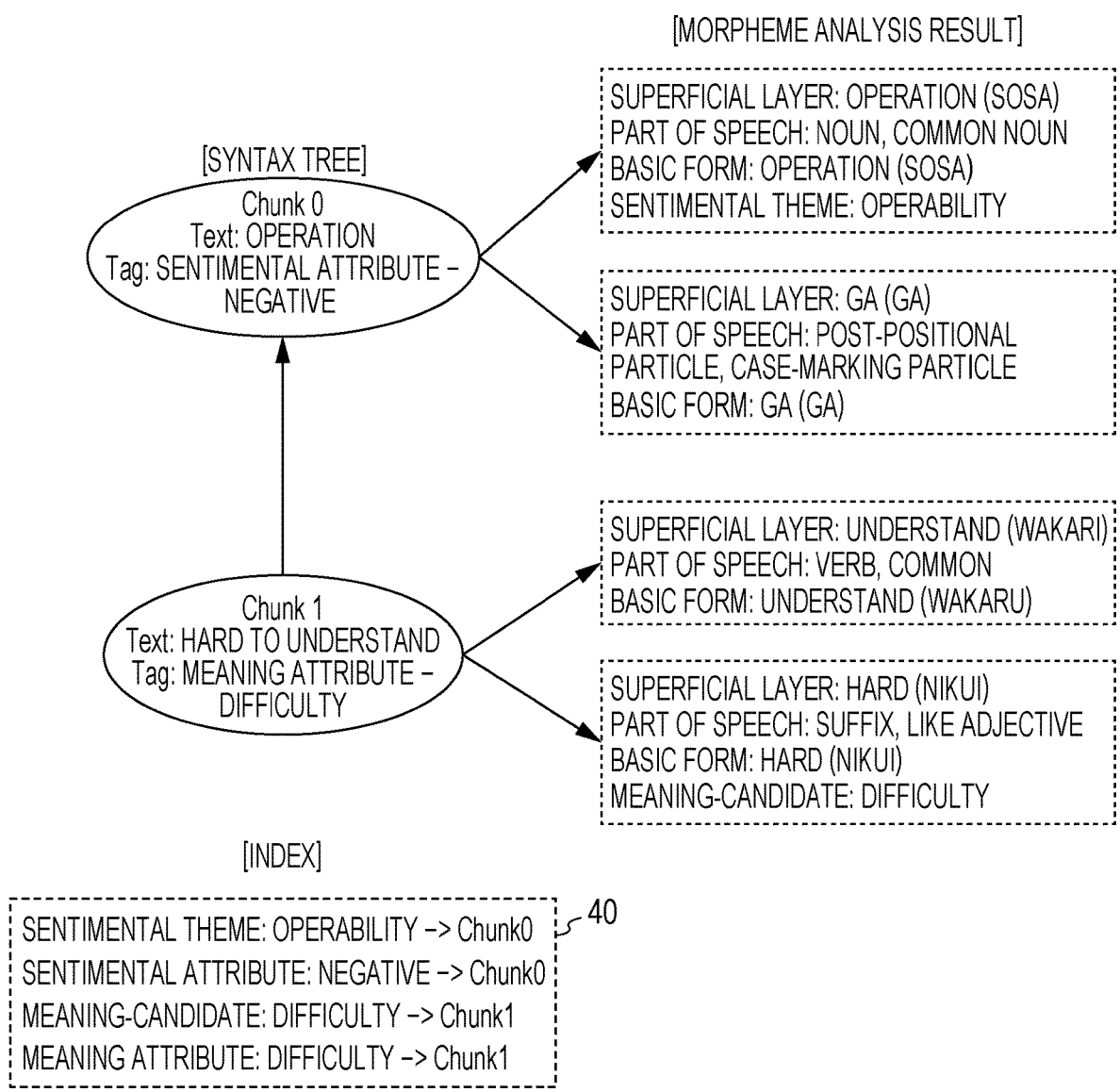
FIG. 19 is a diagram showing an application effect of a sentimental analysis rule in Example 2.

In this example, the application condition of a certain sentimental analysis rule has matched, wherefore a sentimental attribute tag "negative" is set for the clause 0 (Chunk 0) in accordance with the application effect as shown in FIG. 19.

The application condition and application effect of this sentimental analysis rule are as follows, for example.
[Application Condition]:
A morpheme "understand (reading of basic form)" is present.
[Application Effect]:
A sentimental attribute tag "negative" is given to the modifying clause (child chunk).

According to the example described above, the system 10 has been applied to analysis of a text written in Japanese. However, the system 10 may be applied to a text written in a language other than Japanese, such as English and Chinese.

To achieve this purpose, the morpheme analysis (including deposition of input text into morphemes or words, and identification of parts of speech) unit 12, the syntax analysis unit 13, the compound noun merge unit 14, the word dictionary 24, the meaning attribute dictionary 25, the large/small expression dictionary 26, the sentimental expression dictionary 27, the sentimental theme dictionary, the user dictionary, the analysis model, the meaning attribute rule, and the sentimental analysis rule, all corresponding to respective languages, are prepared in advance.

An analysis example of a text written in English is hereinafter presented.

Example 3

Figure 20:
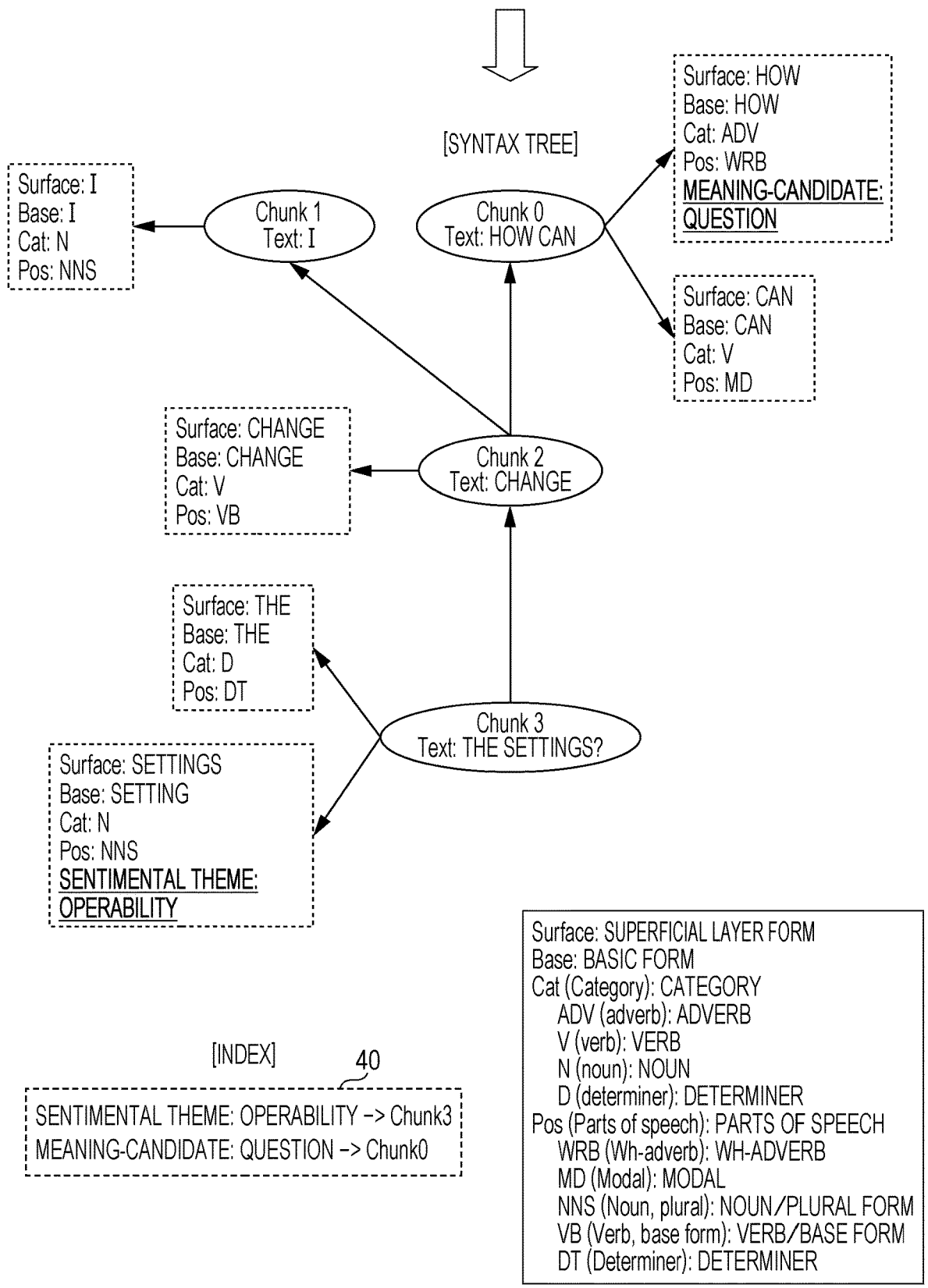
FIG. 20 is a diagram showing a syntax tree in Example 3.

FIG. 20 shows morpheme analysis and a syntax analysis result at the time of input of an English text "How can I change the settings?".

As shown in the figure, the index 40 describes that a sentimental theme tag "operability" is set for a clause 3 (Chunk 3) and a meaning-candidate "question" tag is set for the clause 0 (Chunk 0).

In this case, the meaning attribute extraction unit 15 extracts a meaning attribute rule for question from the meaning attribute rule storage unit 22, and sequentially applies an application condition of each meaning attribute rule to a syntax tree of the concerned text. Then, the meaning attribute extraction unit 15 executes a process specified in an application effect of the concerned meaning attribute rule at the time of matching.

Figure 21:
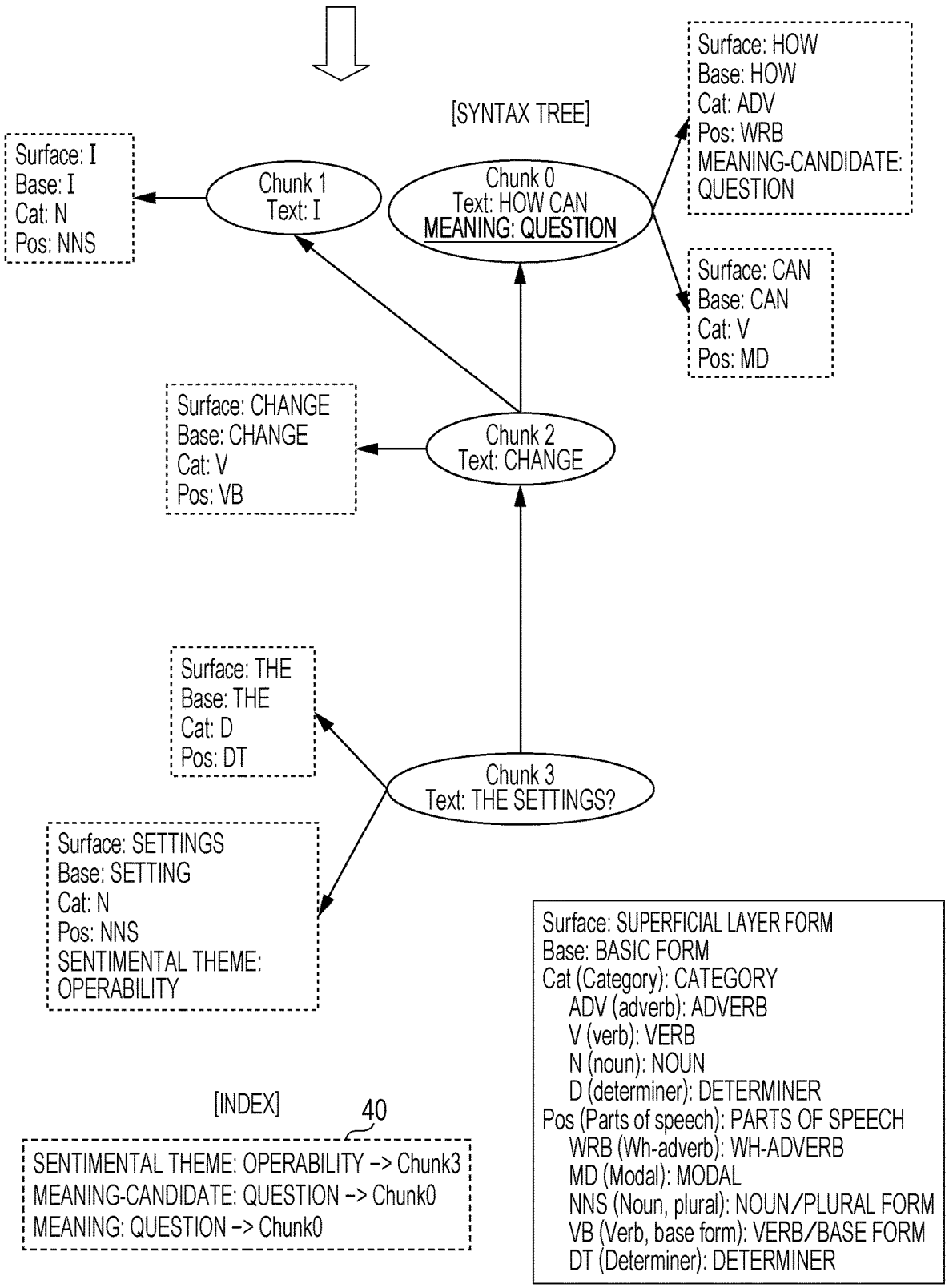
FIG. 21 is a diagram showing an application effect of a meaning attribute rule in Example 3.

FIG. 21 shows an application result of a certain meaning attribute rule. A meaning attribute tag "question" is set for the clause 0 (Chunk 0), and information indicating this setting is also added to the index 40.

The application condition and application effect of this meaning attribute rule are as follows, for example.
[Application Condition]:
Wh-adverb (pos: WRB) modifies Verb (Cat: V).
[Application Effect]:
A meaning attribute tag of question is given to a modifying part.

The sentimental analysis unit 16 attempted to apply the sentimental analysis rule associated with the sentimental theme "operability" to the output from the meaning attribute extraction unit 15. However, no matching rule was present, wherefore the sentimental attribute tag (positive/negative) was not set.

Accordingly, what is shown in FIG. 21 is a final analysis result for the English text "How can I change the settings?"

Example 4

Figure 22:
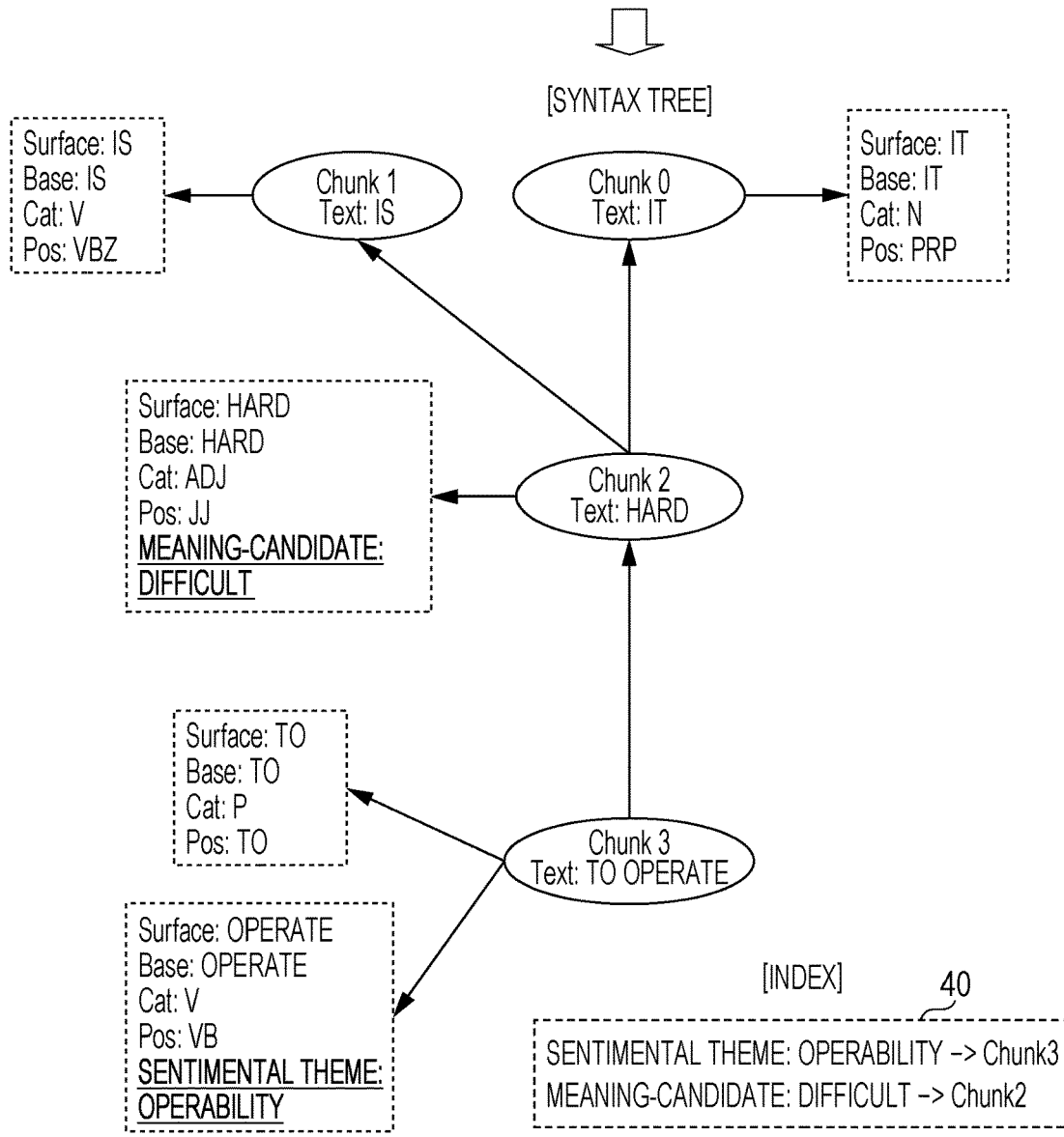
FIG. 22 is a diagram showing a syntax tree according to Example 4.

FIG. 22 shows morpheme analysis and a syntax analysis result at the time of input of an English text "It is hard to operate".

As shown in the figure, the index 40 describes that a sentimental theme tag "operability" is set for the clause 3 (Chunk 3), and that a meaning-candidate "difficult" tag is set for the clause 2 (Chunk 2).

In this case, the meaning attribute extraction unit 15 extracts a meaning attribute rule for difficulty from the meaning attribute rule storage unit 22, and sequentially applies an application condition of each meaning attribute rule to a syntax tree of the concerned text. Then, the meaning attribute extraction unit 15 executes a process specified in an application effect of the concerned meaning attribute rule at the time of matching.

Figure 23:
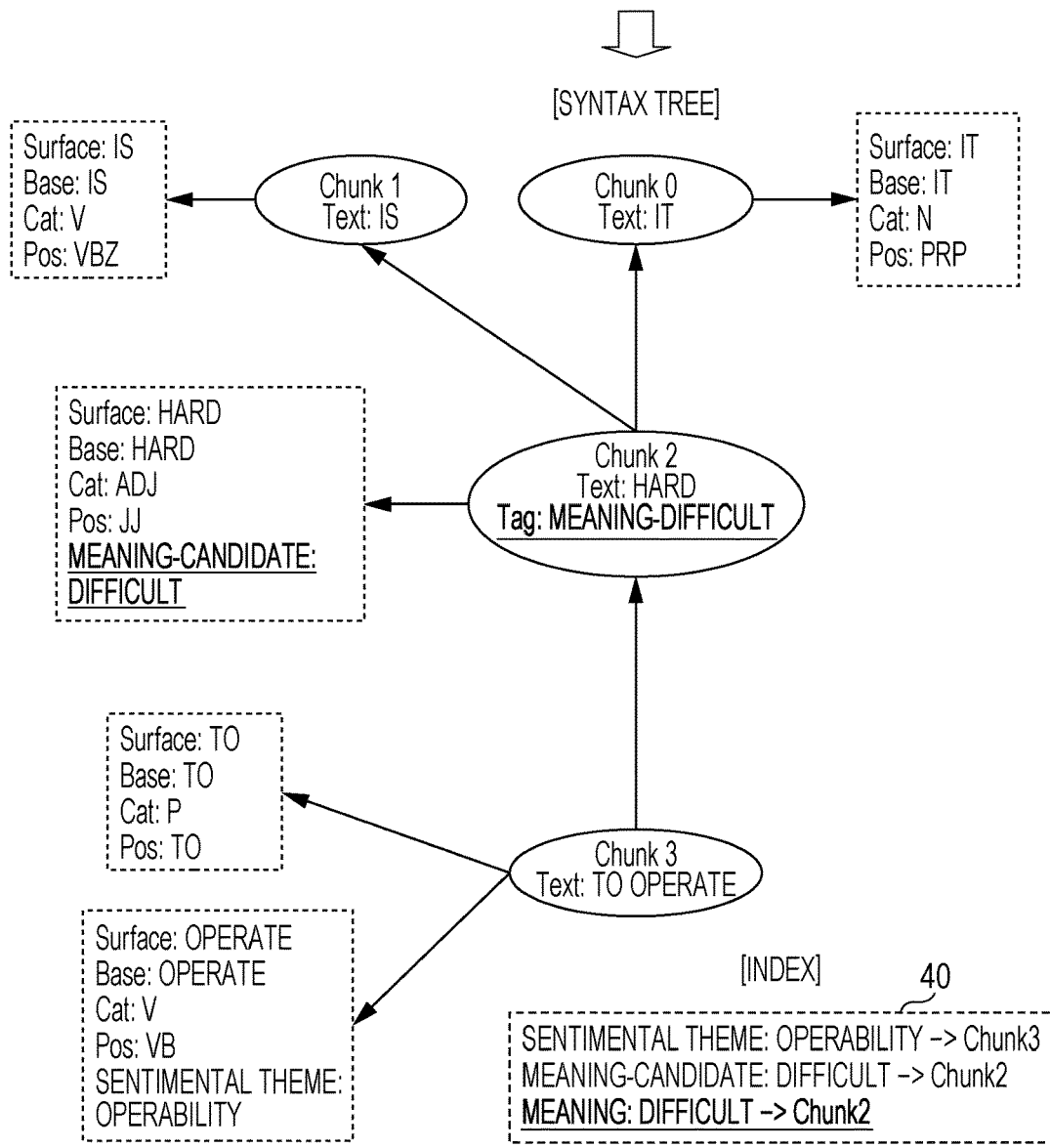
FIG. 23 is a diagram showing an application effect of a meaning attribute rule in Example 4.

FIG. 23 shows an application result of a certain meaning attribute rule. A meaning attribute tag "difficult" is set for the clause 2 (Chunk 2), and information indicating this setting is also added to the index 40.

The application condition and application effect of this meaning attribute rule are as follows, for example.
[Application Condition]:
An adjective (JJ) expressing "difficult" is present.
[Application Condition]:
A meaning attribute tag of difficulty is given to the corresponding chunk.

The sentimental analysis unit 16 attempts to apply the sentimental analysis rule associated with the sentimental theme "operability" to the output from the meaning attribute extraction unit 15.

Figure 24:
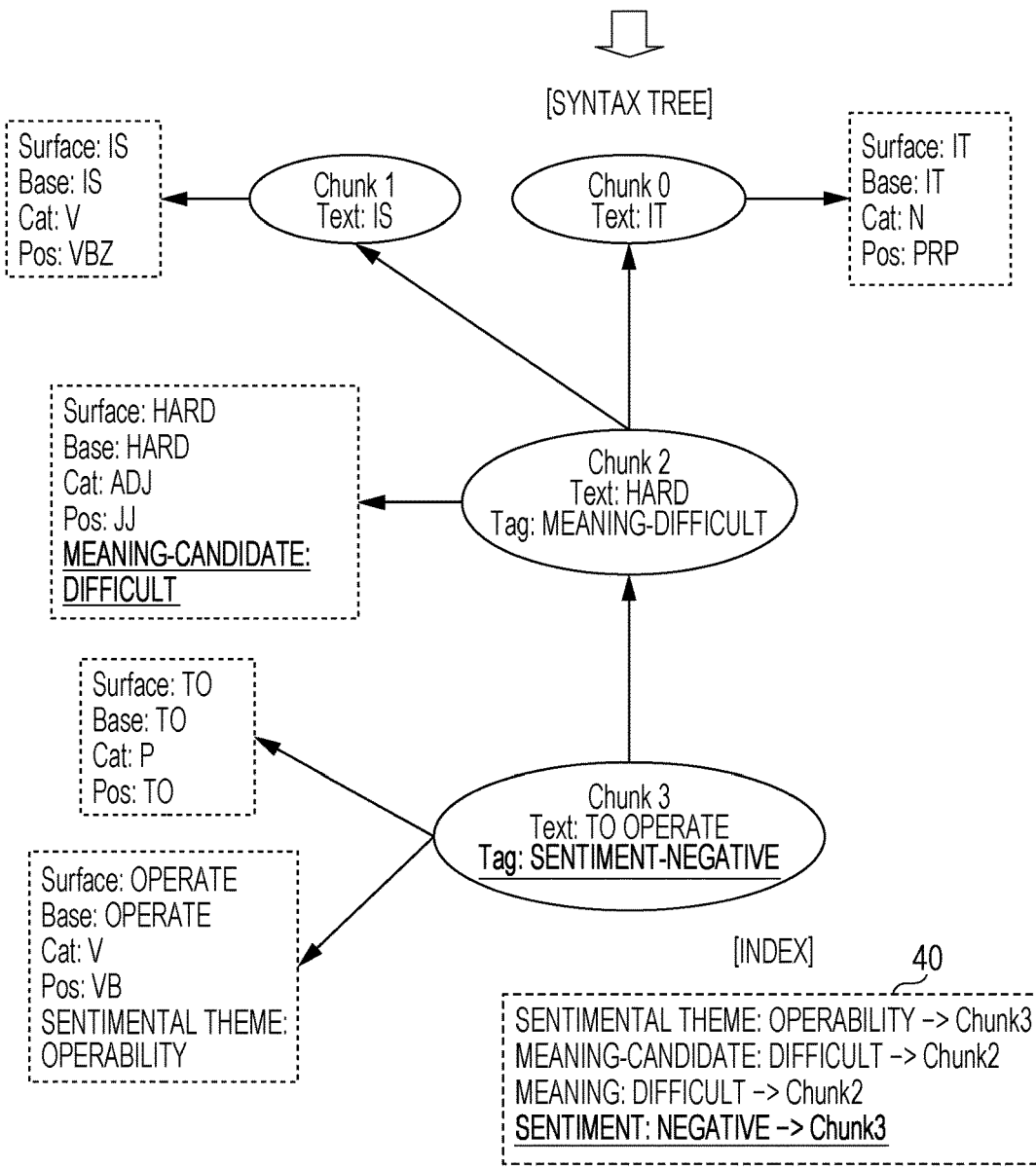
FIG. 24 is a diagram showing an application effect of a sentimental analysis rule in Example 4.

In this example, the application condition of a certain sentimental analysis rule has matched, wherefore the sentimental attribute tag "negative" is set for the clause 3 (Chunk 3), and information indicating this setting is added to the index 40 in accordance with the application effect as shown in FIG. 24.

The application condition and application effect of this sentimental analysis rule are as follows, for example.
[Application Condition]:
(1) The meaning attribute tag of difficulty (difficult) is present in the parent chunk.
(2) To+verb (VB) is present in the child chunk.
[Application Effect]:
A negative sentimental attribute tag is given to the child chunk.

EXPLANATION OF REFERENCES

10: text analysis system
  12: morpheme analysis unit
  13: syntax analysis unit
  14: compound noun merge unit
  15: meaning attribute extraction unit
  16: sentimental analysis unit
  17: setting file
  18: system dictionary storage unit
  19: sentimental theme dictionary storage unit
  20: user dictionary storage unit
  21: analysis model storage unit
  22: meaning attribute rule storage unit
  23: sentimental analysis rule storage unit
  24: word dictionary
  25: meaning attribute dictionary
  26: large/small expression dictionary
  27: sentimental expression dictionary
  28: text file
  29: analysis results
  40: index

What is claimed is:
1. A text analysis system, comprising:
a memory configured to store attribute dictionaries; and
a processor configured to
  decompose input text into morphemes;
  set pre-tags in the memory for the morphemes with reference to the attribute dictionaries, each pre-tag specifying a correspondence relationship between specific morphemes and an attribute type;
  identify a dependency relationship between respective morphemes or respective clauses, each clause being an aggregation of at least two of the morphemes;
  generate an index, in the memory, combining identification information that identifies a first one of the morphemes or the clauses, the pre-tag set for the first one of the morphemes or the clauses, and a tag type of the pre-tag;
  store a plurality of determination rules, in the memory, each including an application condition that designates at least a second one of the morphemes or the clauses, including a specific type of the pre-tags, and an application effect that specifies a third one of the morphemes or the clauses for which an attribute tag is set and the attribute type of the attribute tag; and
  set, with reference to the index and the determination rules, the attribute tag of the attribute type of at least one concerned morpheme or at least one concerned clause in a concerned text, designated in one of the determination rules when the application effect and the application condition of the one of the determi- nation rules match the at least one concerned morpheme or the at least one concerned clause in the concerned text.

2. The text analysis system according to claim 1, wherein:
at least one of the attribute dictionaries is a meaning attribute dictionary that specifies a first correspondence relationship between first specific morphemes and the attribute type of a meaning attribute;
a meaning-candidate tag is set as the pre-tag for a first concerned morpheme;
the index includes a first combination of the identification information that identifies a first clause having the meaning-candidate tag and the tag type of the meaning-candidate tag;
the determination rules include a second combination of a first application condition that designates at least first clauses having a first specific type of the meaning-candidate tag and a first application effect that designates second clauses having the meaning attribute tag and the attribute type of the meaning attribute tag; and
the system determines, with reference to the index and the determination rules, the meaning attribute tag of the attribute type designated in the second combination when the first application effect and the first application condition matches the at least one concerned clause in the concerned text.

3. The text analysis system according to claim 2, wherein:
at least another of the attribute dictionaries is a sentimental theme dictionary that specifies a second correspondence relationship between the specific morphemes and a theme type of a sentimental theme;
a sentimental theme tag is set as the pre-tag for a second concerned morpheme;
the index includes a third combination of the identification information that identifies a second clause having the sentimental theme tag and the theme type of the sentimental theme tag;
the determination rules include a fourth combination of a second application condition that designates third clauses having a second specific type of the sentimental theme tag and the attribute type of the meaning attribute tag included in the second clause or a third clause, and a second application effect that designates fourth clauses having a sentimental attribute tag and the attribute type of the sentimental attribute tag; and
the system determines, with reference to the index and the determination rules, the sentimental attribute tag of the attribute type designated in the fourth combination when the second application effect and the second application condition matches the at least one concerned clause in the concerned text.

4. The text analysis system according to claim 1, wherein:
the attribute dictionaries include a sentimental theme dictionary that specifies a first correspondence relationship between the specific morphemes and a theme type of a sentimental theme, and a large/small expression dictionary that specifies a second correspondence relationship between the specific morphemes and an expression type of a large/small expression;
a sentimental theme tag and a large/small expression tag are set as pre-tags for a concerned morpheme;
the index includes a first combination of the identification information that identifies a first clause having the sentimental theme tag and the theme type of the sentimental theme tag, and a second combination of the identification information that identifies a second clause having the large/small expression tag and the expression type of the large/small expression;
the determination rules include a third combination of a first application condition that designates third clauses having a first specific type of the sentimental theme tag and a second specific type of the large/small expression tag included in the third clauses or a different clause, and a first application effect that designates fourth clauses having the sentimental attribute tag and the attribute type of the sentimental attribute tag; and
the system determines, with reference to the index and the determination rules, the sentimental attribute tag of the attribute type designated in the first application effect when the first application condition matches the at least one concerned morpheme or the at least one concerned clause in the concerned text.

5. The text analysis system according to claim 1, wherein:
the attribute dictionaries include a sentimental theme dictionary that specifies a first correspondence relationship between the specific morphemes and a theme type of a sentimental theme, and a sentimental expression dictionary that specifies a second correspondence relationship between the specific morphemes and an expression type of a sentimental expression;
a sentimental theme tag and a sentimental expression tag are set as pre-tags for a concerned morpheme;
the index includes a first combination of the identification information that identifies a first clause having the sentimental theme tag and the theme type of the sentimental theme tag, and a second combination of the identification information that identifies a second clause having the sentimental expression tag and the expression type of the sentimental expression;
the determination rules include a third combination of a specific application condition that designates third clauses having a first specific type of the sentimental theme tag and a second specific type of the sentimental expression tag included in the third clauses or a different clause, and a specific application effect that designates fourth clauses having the sentimental attribute tag and the attribute type of the sentimental attribute tag; and
the system determines, with reference to the index and the determination rules, the sentimental attribute tag of the attribute type designated in the specific application effect when the specific application condition matches the at least one concerned morpheme or the at least one concerned clause in the concerned text.

6. A non-transitory computer readable medium embodying a text analysis program which, when executed by a computer, causes the computer to perform a method comprising:
decomposing input text into morphemes;
setting pre-tags for the morphemes with reference to attribute dictionaries each pre-tag specifying a correspondence relationship between specific morphemes and an attribute type;
identifying a dependency relationship between respective morphemes or respective clauses, each clause being an aggregation of at least two of the morphemes;
generating an index containing a first combination of identification information that identifies a first one of the morphemes or the clauses, the pre-tag set for the first one of the morphemes or the clauses, and a pre-tag type of the pre-tag;
storing a plurality of determination rules, each including a second combination of an application condition that designates at least a second one of the morphemes or the clauses, including a specific type of the pre-tags, and an application effect that specifies a third one of the morphemes or the clauses for which an attribute tag is set and the attribute type of the attribute tag; and determining, with reference to the index and the determination rules, the attribute tag of the attribute type of at least one concerned morpheme or at least one concerned clause in a concerned text, designated in one of the determination rules when the application effect and the application condition of the one of the determination rules match the concerned text.

7. The text analysis system according to claim 4, wherein:

the attribute dictionaries further include a sentimental expression dictionary that specifies a third correspondence relationship between the specific morphemes and an expression type of a sentimental expression;

a sentimental expression tag is set as another pre-tag for the concerned morpheme;

the index includes a fourth combination of the identification information that identifies a fifth clause having the sentimental theme tag and the theme type of the sentimental theme tag, and a fifth combination of the identification information that identifies a sixth clause having the sentimental expression tag and the expression type of the sentimental expression;

the determination rules include a sixth combination of a second application condition that designates seventh clauses having a third specific type of the sentimental theme tag and a fourth specific type of the sentimental expression tag included in the seventh clauses or a different clause, and a second application effect that designates eighth clauses having the sentimental attribute tag and the attribute type of the sentimental attribute tag; and the system determines, with reference to the index and the determination rules, the sentimental attribute tag of the attribute type designated in the second application effect when the second application condition matches the at least one concerned morpheme or the at least one concerned clause in the concerned text.

\* \* \* \* \*